(12) United States Patent
Kano

(10) Patent No.: US 10,425,734 B2
(45) Date of Patent: Sep. 24, 2019

(54) NOISE CONTROL APPARATUS AND NOISE CONTROL METHOD

(71) Applicant: Panasonic Intellectual Property Corporation of America, Torrance, CA (US)

(72) Inventor: Hiroyuki Kano, Hyogo (JP)

(73) Assignee: PANASONIC INTELLECTUAL PROPERTY CORPORATION OF AMERICA, Torrance, CA (US)

(*) Notice: Subject to any disclaimer, the term of this patent is extended or adjusted under 35 U.S.C. 154(b) by 0 days.

(21) Appl. No.: 16/151,515

(22) Filed: Oct. 4, 2018

(65) Prior Publication Data

US 2019/0116421 A1 Apr. 18, 2019

(30) Foreign Application Priority Data

Oct. 13, 2017 (JP) ................................ 2017-199881

(51) Int. Cl.
*H04R 3/04* (2006.01)
*G01G 19/44* (2006.01)
(Continued)

(52) U.S. Cl.
CPC .............. *H04R 3/04* (2013.01); *G01G 19/44* (2013.01); *G10K 11/178* (2013.01);
(Continued)

(58) Field of Classification Search
CPC .............. H04R 3/04; H04R 2227/001; H04R 2499/13; G10K 11/16; G10K 11/178;
(Continued)

(56) References Cited

U.S. PATENT DOCUMENTS 5,748,748 A * 5/1998 Fischer ............... G10K 11/178
381/71.4
8,820,782 B2 * 9/2014 Breed ..................... B60J 10/00
280/735

(Continued)

FOREIGN PATENT DOCUMENTS

JP 7-131883 5/1995
JP 7-193900 7/1995
(Continued)

OTHER PUBLICATIONS

P. A. Nelson et al., "Active Control of Sound", Academic Press, London, 1992, pp. 195-198, 407-410.

*Primary Examiner* — Jason R Kurr
(74) *Attorney, Agent, or Firm* — Greenblum & Bernstein, P.L.C.

(57) ABSTRACT

Disclosed is a noise control apparatus which reduces noise at a position away from a head of a passenger in a seat in a room under a noisy environment created by a noise source. The apparatus includes: a weight sensor, and control speakers installed in the seat; a noise detector which detects the noise from the noise source, and outputs a noise signal; a control circuit which obtains the noise signal, and outputs a control signal for reducing the noise to the speakers; and a memory which stores control coefficients each used to generate the control signal for reducing the noise at a position which becomes higher from the seat as the corresponding weight becomes heavier. The circuit reads a coefficient corresponding to a detected weight or a correlation value from the coefficients, and outputs the control signal generated using the noise signal and the read coefficient to the speakers.

18 Claims, 19 Drawing Sheets

(51) Int. Cl.
*G10L 21/0208* (2013.01)
*G10K 11/178* (2006.01)

(52) U.S. Cl.
CPC .... *G10L 21/0208* (2013.01); *H04R 2227/001* (2013.01); *H04R 2499/13* (2013.01)

(58) Field of Classification Search
CPC ....... G10K 11/17823; G10K 11/17879; G10K 2210/128; G10K 2210/1282; G10K 2210/1281; G10K 2210/1283; G10L 21/0208; G01G 19/44
See application file for complete search history.

(56) References Cited

U.S. PATENT DOCUMENTS

| | | | |
|---|---|---|---|
| 2011/0222698 A1* | 9/2011 | Asao | G10K 11/17825 381/71.1 |
| 2014/0244106 A1* | 8/2014 | Singer | G06F 17/00 701/36 |
| 2014/0270220 A1* | 9/2014 | Bieler | G10K 11/178 381/71.4 |
| 2016/0039356 A1* | 2/2016 | Talwar | H04R 3/00 381/86 |

FOREIGN PATENT DOCUMENTS

| | | |
|---|---|---|
| JP | 2005-167378 | 6/2005 |
| JP | 2009-045302 | 3/2009 |

\* cited by examiner

FIG. 2

| AGE AND SEX | HEIGHT (cm) | | WEIGHT (kg) | |
|---|---|---|---|---|
| | AVERAGE | STANDARD DEVIATION | AVERAGE | STANDARD DEVIATION |
| M12: 12-YEAR-OLD MAN | 152.3 | 7.5 | 42.9 | 11.5 |
| M13: 13-YEAR-OLD MAN | 159.3 | 7.0 | 47.6 | 9.4 |
| M14: 14-YEAR-OLD MAN | 164.3 | 5.6 | 51.2 | 5.8 |
| M15: 15-YEAR-OLD MAN | 167.5 | 5.1 | 55.6 | 8.2 |
| M16: 16-YEAR-OLD MAN | 168.9 | 7.3 | 58.2 | 7.3 |
| M17: 17-YEAR-OLD MAN | 172.4 | 6.7 | 64.6 | 15.5 |
| M18: 18-YEAR-OLD MAN | 170.5 | 7.7 | 60.7 | 9.0 |
| M19: 19-YEAR-OLD MAN | 174.9 | 6.1 | 68.0 | 11.5 |
| M20: 20-YEAR-OLD MAN | 171.7 | 6.6 | 68.3 | 13.8 |
| M30: 30-YEAR-OLD MAN | 172.0 | 6.0 | 71.2 | 14.0 |
| M40: 40-YEAR-OLD MAN | 170.8 | 5.4 | 70.6 | 11.8 |
| M50: 50-YEAR-OLD MAN | 169.2 | 5.9 | 68.1 | 10.3 |
| M60: 60-YEAR-OLD MAN | 167.0 | 5.8 | 66.3 | 9.8 |
| W12: 12-YEAR-OLD WOMAN | 150.8 | 5.5 | 39.7 | 6.4 |
| W13: 13-YEAR-OLD WOMAN | 155.5 | 5.8 | 46.1 | 6.2 |
| W14: 14-YEAR-OLD WOMAN | 157.2 | 6.6 | 47.2 | 6.4 |
| W15: 15-YEAR-OLD WOMAN | 155.9 | 4.9 | 48.1 | 6.3 |
| W16: 16-YEAR-OLD WOMAN | 157.8 | 5.5 | 50.5 | 7.0 |
| W17: 17-YEAR-OLD WOMAN | 155.0 | 4.9 | 49.6 | 7.3 |
| W18: 18-YEAR-OLD WOMAN | 158.8 | 5.3 | 53.4 | 4.4 |
| W19: 19-YEAR-OLD WOMAN | 157.0 | 5.0 | 50.5 | 10.9 |
| W20: 20-YEAR-OLD WOMAN | 158.3 | 5.7 | 52.2 | 9.2 |
| W30: 30-YEAR-OLD WOMAN | 158.2 | 5.9 | 52.0 | 7.1 |
| W40: 40-YEAR-OLD WOMAN | 158.0 | 5.5 | 55.5 | 10.1 |
| W50: 50-YEAR-OLD WOMAN | 156.6 | 5.1 | 55.0 | 9.9 |
| W60: 60-YEAR-OLD WOMAN | 153.3 | 5.4 | 53.3 | 8.0 |

FIG. 4

| | | UNDERWEIGHT BMI<18.5 | NORMAL RANGE 18.5≤BMI<25 | OVERWEIGHT AND OBESE 25≤BMI |
|---|---|---|---|---|
| | | % | % | % |
| TOTAL | TOTAL | 8.5 | 68.5 | 23.1 |
| | 15 TO 19 YEARS OLD | 19.8 | 75.1 | 5.1 |
| | 20 TO 29 YEARS OLD | 16.3 | 66.1 | 17.6 |
| | 30 TO 39 YEARS OLD | 9.8 | 72.1 | 18.0 |
| | 40 TO 49 YEARS OLD | 7.0 | 66.9 | 26.2 |
| | 50 TO 59 YEARS OLD | 7.7 | 66.2 | 26.1 |
| | 60 TO 69 YEARS OLD | 5.3 | 69.1 | 25.3 |
| | 70 YEARS OLD OR OLDER | 8.2 | 68.0 | 23.8 |
| MEN | TOTAL | 4.9 | 66.7 | 28.4 |
| | 15 TO 19 YEARS OLD | 19.8 | 73.6 | 6.6 |
| | 20 TO 29 YEARS OLD | 8.9 | 64.5 | 26.6 |
| | 30 TO 39 YEARS OLD | 3.7 | 66.0 | 30.3 |
| | 40 TO 49 YEARS OLD | 2.7 | 60.8 | 36.5 |
| | 50 TO 59 YEARS OLD | 2.7 | 64.1 | 33.2 |
| | 60 TO 69 YEARS OLD | 3.6 | 66.8 | 29.6 |
| | 70 YEARS OLD OR OLDER | 5.3 | 70.9 | 23.8 |
| WOMEN | TOTAL | 11.4 | 69.9 | 18.7 |
| | 15 TO 19 YEARS OLD | 19.8 | 76.7 | 3.4 |
| | 20 TO 29 YEARS OLD | 22.3 | 67.5 | 10.2 |
| | 30 TO 39 YEARS OLD | 15.5 | 77.8 | 6.6 |
| | 40 TO 49 YEARS OLD | 10.0 | 71.2 | 18.8 |
| | 50 TO 59 YEARS OLD | 11.6 | 67.9 | 20.6 |
| | 60 TO 69 YEARS OLD | 6.7 | 71.6 | 21.7 |
| | 70 YEARS OLD OR OLDER | 10.7 | 65.5 | 23.8 |

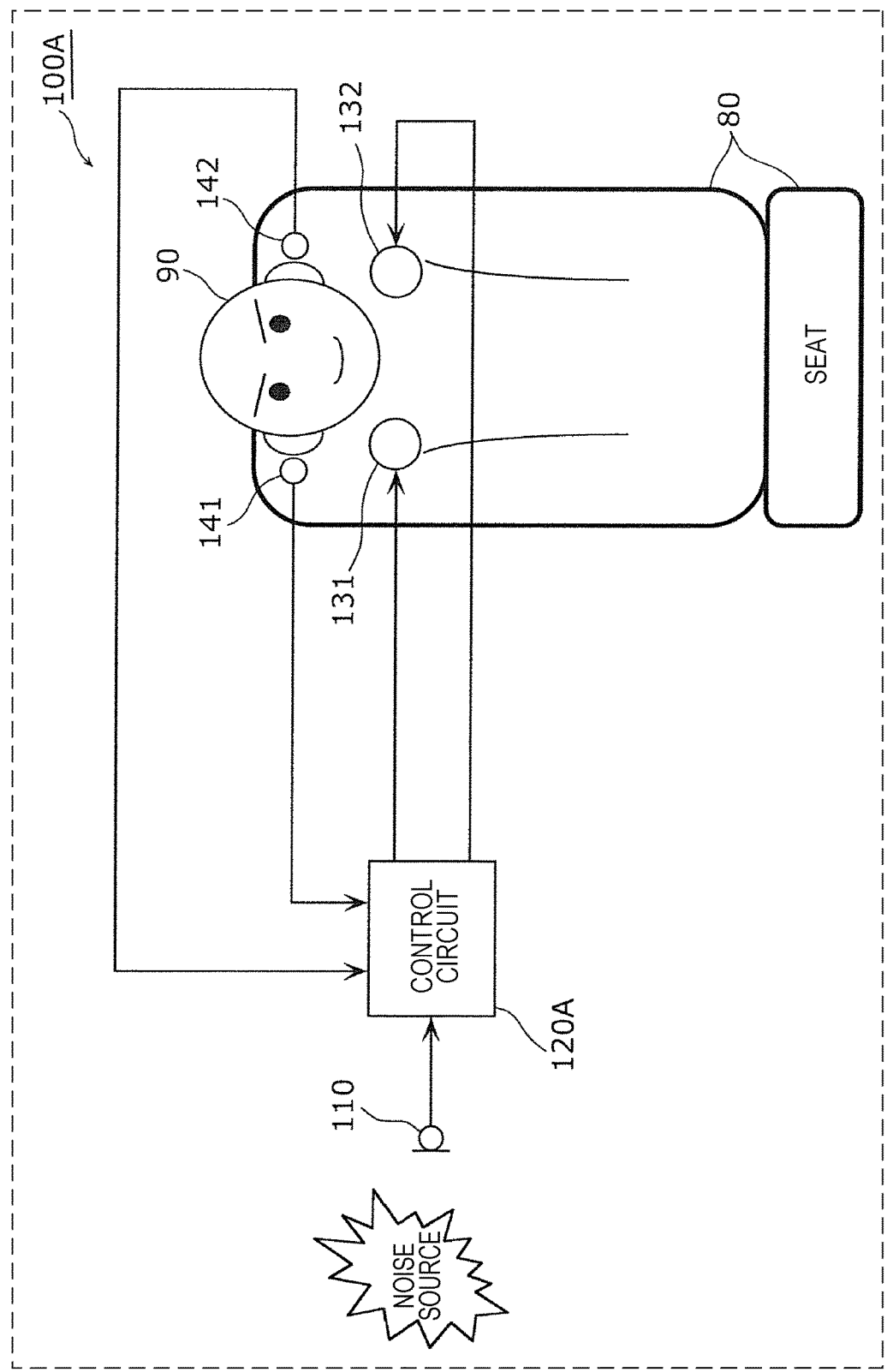

NOISE CONTROL APPARATUS AND NOISE CONTROL METHOD

BACKGROUND

1. Technical Field

The present disclosure relates to a noise control apparatus and a noise control method which reduce noise near the head of a passenger seated in a seat in a vehicle used for public transportation such as an automobile and an aircraft.

2. Description of the Related Art

Active noise control has been known through disclosure by Japanese Unexamined Patent Application Publication No. 2009-45302 (hereinafter referred to as Patent Document 1), as well as P. A. Nelson and S. J. Elliot, *Active Control of Sound*, pp. 195-198 and 407-409 (Academic Press, London) (1992) (hereinafter referred to as Non-patent Documents 1 and 2). Active noise control is a technique for actively reducing noise by outputting sound with a phase opposite to that of the noise against the noise.

SUMMARY

In one general aspect, the techniques disclosed here feature a noise control apparatus which reduces noise at a position away from a head of a passenger seated in a seat by a predetermined distance, the seat installed in a room under a noisy environment created by a predetermined noise source. The noise control apparatus includes: a weight sensor installed in the seat; a control speaker installed at a first position in the seat; a noise detector which detects the noise from the noise source, and outputs a noise signal representing the detected noise; a control circuit which obtains the noise signal outputted from the noise detector, and outputs a control signal to the control speaker, the control signal being that which reduces the noise at the position away from the head of the passenger by the predetermined distance; and a memory which stores multiple control coefficients respectively set at different values depending on weights or on correlation values correlating with the weights, each control coefficient used to generate the control signal which reduces the noise at a position which becomes higher in a height direction from a seat surface of the seat as the corresponding weight becomes heavier. The control circuit reads the control coefficient corresponding to the weight of the passenger detected by the weight sensor or to a correlation value correlating with the weight from the memory, the control coefficient being one among the multiple control coefficients; generates the control signal by use of the noise signal and the read control coefficient; and outputs the generated control signal to the control speaker.

The noise control apparatus disclosed therein is capable of effectively reducing noise.

It should be noted that general or specific embodiments may be implemented as a system, a method, an integrated circuit, a computer program, a storage medium such as a computer-readable CD-ROM, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 2 is a table excerpted from "Table 12 Height and Weight in Average and Standard Deviation—Age Class—Men and Women" in Ministry of Health, Labor and Welfare of Japan Annual Report "Health and Nutrition of Japanese People, Heisei Year 27 (2015)";

FIG. 4 is a table excerpted from "Table 15-1 BMI in Japan—Age Class, Level of Obesity (by BMI Category), Population, Ratio—Total Population, Men and Women" in Ministry of Health, Labor and Welfare of Japan Annual Report "Health and Nutrition of Japanese People, Heisei Year 27 (2015)";

FIG. 19 illustrates a configuration which controls noise at the ears of a passenger who is seated in a seat within an aircraft cabin.

DETAILED DESCRIPTION

Underlying Knowledge Forming Basis of the Present Disclosure

The inventors have found the following problem with the noise control technique.

Use of public transportation such as an aircraft and a train is very convenient for business and trips. In a long-hour travel, however, exposure to flight noise, running noise and the like makes passengers feel unpleasant, as well as accumulated fatigue, stress and the like. Against this background, a solution to this problem by aircrafts and the like is to provide comfortable spaces to passengers. To this end, aircrafts and the like have employed passive noise reduction measures which include improving noise insulation capability of aircraft fuselage panels to reduce noise heard by passengers. The conventional noise insulation measures aim at the improvement in noise insulation capability of aircraft fuselage panels by modifying the aircraft fuselage panels, and adversely affect the weight of the vehicle fuselage. An increase in vehicle fuel mileage by a reduction in vehicle weight, therefore, makes it difficult to obtain a sufficient effect of insulating low-frequency noise. On the other hand, noise which potentially makes passengers feel stress is low-frequency noise, but not high-frequency noise which is easily reduced by the conventional passive noise reduction measures. From this viewpoint, increasing importance is placed on a measure to reduce low-frequency noise.

Research and development have been conducted to achieve the above-mentioned active noise reduction as an effective means to reduce this low-frequency noise. The basic concept is, for example, the filtered-X LMS method discussed in Non-patent Document 1. Using FIG. 18, brief descriptions will be provided for the filtered-X LMS method.

Figure 18:
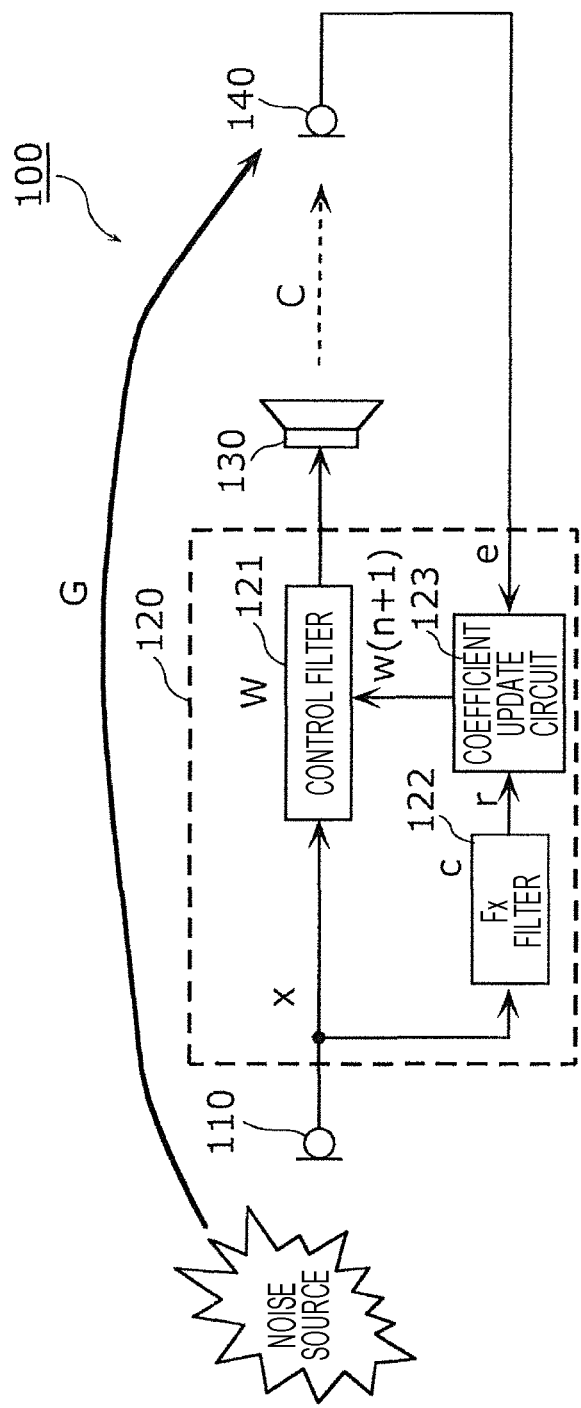
FIG. 18 is a diagram illustrating an example of a configuration of a noise control apparatus which performs an active noise control by use of a filtered-X LMS algorithm.

FIG. 18 is a diagram illustrating an example of a configuration of a noise control apparatus which performs an active noise control using the filtered-X LMS method.

As illustrated in FIG. 18, the noise control apparatus 100 includes a noise detector 110, a control circuit 120, a control speaker 130, and a sound collector 140. The noise control apparatus 100 sends outputs from the control speaker 130. The noise control apparatus 100 reduces noise at a location where the sound collector 140 is placed.

The noise detector 110 detects noise X from a predetermined noise source, and outputs a noise signal representing the noise X to the control circuit 120. The noise detector 110 is, for example, a microphone.

The control circuit 120 obtains the noise signal from the noise detector 110, and based on the obtained noise signal, generates a control signal which reduces the noise X from the noise source at the location where the sound collector 140 is placed when the noise X is propagated to the location through a transfer path G. The control circuit 120 outputs the generated control signal to the control speaker 130. The control circuit 120 further obtains an error signal from the sound collector 140, and generates a control signal which reduces the error signal. The control circuit 120 is implemented using, for example, a processor, a dedicated circuit or the like. The control circuit 120's function of generating the control signals may be implemented using software, or hardware.

The sound collector 140 is a sound collector which collects noise at the location where the sound collector 140 is placed, and is implemented using a microphone.

Specific descriptions will be hereinbelow provided for the function of the control circuit 120.

As coefficients, transfer characteristics from the control speaker 130 to the sound collector 140 are recorded in an Fx filter 122 in the control circuit 120. These coefficients are convolved into the noise signal from the noise detector 110. The resultant signal is inputted into a coefficient update circuit 123.

Based on this inputted signal and the error signal (output signal) from the sound collector 140, the coefficient update circuit 123 updates a control coefficient of a control filter 121 in order for the coefficient to minimize the error signal. The coefficient update circuit 123 usually uses a least mean squares algorism for the purpose of updating the control coefficient. Meanwhile, the Fx filter 122 compensates for the transfer characteristics from the control speaker 130 to the sound collector 140. To put it specifically, the control circuit 120 repeatedly obtains the error signal from the sound collector 140 and adjusts the control coefficient such that the obtained error signal becomes smaller than a previously-obtained error signal. Using the control coefficient obtained through the repeated adjustments, the control circuit 120 generates the control signal, and outputs the control signal from the control speaker 130. Thereby, the control circuit 120 adjusts the control coefficient which minimizes the error signal.

As discussed above, when the noise X from the noise source reaches the sound collector 140 by being propagated via the transfer path G, the control circuit 120 detects the noise X using the noise detector 110, and generates the control signal by processing the noise signal representing the detected noise X using the control filter 121, thus outputting the generated control signal from the control speaker 130. In this point, the sound collector 140 is capable of reducing the noise from the noise source at the location of the sound collector 140 when a condition expressed with $$WXC + GX = 0, \text{ and } W = -G/C \quad \text{(Equation 1)}$$

It should be noted that Equation 1 is expressed in the frequency domain. A method of obtaining a specific characteristic of a control filter W expressed by Equation 1 is a filtered-X LMS algorism, and the filtered-X LMS algorism is calculated in accordance with $$w(n+1) = w(n) + \mu r^T(n) e(n)$$

and $$r(n) = c^T(n) x(n) \quad \text{(Equation 2)}$$

where $[\bullet]^T$ is a transposition, and $\mu$ is a convergence constant. The repetition of this calculation ideally makes the control filter W converge to a condition expressed with Equation 1. Incidentally, Equation 2 is expressed in the time domain.

As learned from FIG. 18, Equation 1 and Equation 2, the transfer characteristics C from the control speaker 130 to the sound collector 140 has an influence on the control filter W. To put it specifically, the Fx filter 122 can performs the process expressed by Equation 2 by beforehand measuring the coefficient c(n) which represents the transfer characteristics C from the control speaker 130 to the sound collector 140. That is to say, the filted-X LMS algorithm is based on an assumption that the transfer characteristics C from the control speaker 130 to the sound collector 140 remains unchanged. If the transfer characteristics C from the control speaker 130 to the sound collector 140 changes after the control filter W converges (that is to say, a control characteristic is obtained), the desired effect cannot be obtained. In other words, even if the transfer characteristics C from the control speaker 130 to the sound collector 140 remains unchanged, the effect cannot be obtained at a place away from the sound collector 140 (≠ the transfer characteristics C).

In this respect, let us examine a case where, for example, flight noise is reduced in an aircraft cabin using the above-discussed noise control apparatus 100. Incidentally, the same thing happens to a case where running noise heard by an occupant in a compartment of an automobile is reduced using the above-discussed noise control apparatus 100.

FIG. 19 illustrates a configuration which controls noise at the ears of a passenger who is seated in a seat within an aircraft cabin.

A noise control apparatus 100A illustrated in FIG. 19 detects noise using a noise detector 110, and signal-processes a noise signal representing the detected noise using a control circuit 120A to generate a control signal. Thus, the noise control apparatus 100A reproduces the control signal using controller speakers 131, 132 installed in a seat 80. Meanwhile, sound collectors 141, 142 are installed at the ears of a passenger 90. The sound collectors 141, 142 detects a combination tone resulting from interferences between the noise and a control tone reproduced from the control signal by the controller speakers 131, 132, and outputs the combination tone to the control circuit 120A. The combination tone serves as an error signal. Based on the error signal obtained from the sound collectors 141, 142 and the noise signal obtained from the noise detector 110, the control circuit 120A makes a control characteristic converge so as to minimize the noise at the ears of the passenger seated in the seat 80. The control circuit 120A in the noise control apparatus 100A repeats this series of actions to reduce the noise at the ears of the passenger.

Unlike the noise control apparatus 100 illustrated in FIG. 18, the noise control apparatus 100A illustrated in FIG. 19 includes the two control speakers 131, 132 and the two sound collectors 141, 142. The mathematical operation to be performed by the control circuit 120A in the noise control apparatus 100A is a multichannel multiple error LMS algorithm based on the filtered-X LMS algorithm expressed with Equation 2. A multichannel multiple error LMS algorithm is discussed, for example, in Non-patent Document 2. The noise control apparatus 100A measures four filter coefficients which respectively represent four transfer characteristics, before performing the mathematical operation. The four transfer characteristics are a transfer characteristic from the control speaker 131 to the sound collector 141, a transfer characteristic from the control speaker 131 to the sound collector 142, a transfer characteristic from the control speaker 132 to the sound collector 141, and a transfer characteristic from the control speaker 132 to the sound collector 142.

The noise control apparatus 100A has been described as including the sound collector 141, 142 which are installed at the ears of a passenger. However, in a case where passengers actually get onboard, it is difficult to always install the sound collectors 141, 142 at the ears of the passenger 90 who is seated in a seat The noise control apparatus 100A, however, can solve this problem by: temporarily using the sound collectors 141, 142 to calculate a control coefficient which the control circuit 120A uses to generate a control signal; and after calculating the control coefficient, generating the control signal using the control coefficient as a fixed value, without using the sound collectors 141, 142.

On the other hand, however, in the case where as discussed above, the control coefficient calculated by temporarily using the sound collectors 141, 142 is used as the fixed value, another problem occurs when a passenger whose height is different from the height used when the control coefficient is calculated gets onboard. For example, in a case where a first passenger taller than a second passenger whose height is used to calculate the control coefficient gets onboard, the positions of the ears of the first passenger are higher than those of the sound collectors 141, 142 which are arranged when the control coefficient is calculated. The method in which the control coefficient is used as the fixed value, therefore, cannot offer a sufficient noise reduction effect to the first passenger whose height is different from that of the second passenger which is used to beforehand calculate the control coefficient.

Using Patent Document 1, descriptions will be provided for a conventional example of how to solve a problem like this. Although Patent Document 1 discloses a voice reproduction apparatus but not a noise control apparatus, the voice reproduction apparatus and the noise control apparatus pursue the same purpose of achieving an appropriate acoustic effect depending on the height of a passenger seated in a seat by use of speakers installed in the seat. According to Patent Document 1, the appropriate acoustic effect depending on the height means a comfortable acoustic space. Although Patent Document 1 does not provide specific descriptions for the appropriate acoustic space, one may consider that examples of the comfortable acoustic space include a space where the clarity of the voice guidance from a navigation system is achieved, and a pace where comfortable stereophonic sound is realized in audio playback.

As mentioned above, the technique disclosed in Patent Document 1 intends to provide a comfortable acoustic space for each passenger by: estimating the height of the passenger based on the position of the headrest; and changing the directions of the respective speakers, and compensating for the sound pressure of the playback sound, depending on the estimated height of the passenger. From a size viewpoint, however, a vehicle seat, not limited to that of an automobile, has no enough room for the weight reduction. This makes it difficult to provide a mechanism which changes the directions of the speakers installed in the seat.

Furthermore, a speaker which controls noise need to control particularly low-frequency noise, and is accordingly required to have a capability of reproducing low-pitch sound. This requires the speaker to employ a speaker unit which includes a large diaphragm and a large magnetic circuit for sufficiently vibrating the diaphragm. Like this, the realization of the capability of sufficiently reproducing low-pitch sound leads to an increase in the size of the speaker unit. The realization of the capability of reproducing low-pitch sound requires a speaker box having a certain volume (for example, one liter) or more in addition to the large speaker unit. In other words, the realization of changes in the directions of the speakers inside the seat requires the space inside the seat to be large enough to allow the changes in the directions of the speakers, and the mechanism for changing the directions of the speakers to be provided inside the seat. This configuration, however, increases the size of the seat, the size of the speaker. This configuration further increases the weight of the seat because the mechanism for changing the directions of the speakers is provided to the seat. For these reasons, the employment of this configuration for a vehicle increases the weight of the vehicle, and worsens the fuel mileage of the vehicle.

Moreover, Patent Document 1 discloses the configuration in which the height of a passenger is measured based on the position of the headrest. However, there is almost no aircraft seat which separates the headrest and the seat main body. The aircraft seat which does not separate the headset and the main seat body cannot be used for the height measurement.

Japanese Unexamined Patent Application Publications No. 2005-167378 listed as a conventional example in Patent Document 1 has a problem that no speaker is installed in a seat. Besides, Japanese Unexamined Patent Application Publications Nos. 7-131883 and 7-193900 have a problem of needing multiple sensors.

In short, there is likelihood that the above conventional active noise control techniques are incapable of reducing noise effectively.

The present disclosure provides a noise control apparatus and a noise control method which are capable of reducing noise effectively.

A noise control apparatus according to an aspect of the present disclosure is a noise control apparatus which reduces noise at a position away from a head of a passenger seated in a seat by a predetermined distance, the seat installed in a room under a noisy environment created by a predetermined noise source. The noise control apparatus includes: a weight sensor installed in the seat; a control speaker installed at a first position in the seat; a noise detector which detects the noise from the noise source, and outputs a noise signal representing the detected noise; a control circuit which obtains the noise signal outputted from the noise detector, and outputs a control signal to the control speaker, the control signal being that which reduces the noise at the position away from the head of the passenger by the predetermined distance; and a memory which stores multiple control coefficients respectively set at different values depending on weights or on correlation values correlating with the weights, each control coefficient used to generate the control signal which reduces the noise at a position which becomes higher in a height direction from a seat surface of the seat as the corresponding weight becomes heavier. The control circuit reads the control coefficient corresponding to the weight of the passenger detected by the weight sensor or to a correlation value correlating with the weight from the memory, the control coefficient being one among the multiple control coefficients; generates the control signal by use of the noise signal and the read control coefficient; and outputs the generated control signal to the control speaker.

Thereby, the control signal with the position of the head of the passenger taken into consideration can be generated by use of the control coefficient corresponding to the weight of the seated passenger, or to the correlation value correlating with the weight. Accordingly, the noise can be effectively reduced at the position of the head of the seated passenger.

In addition, the noise control apparatus may further include a height estimator which estimates a height of the passenger depending on the weight of the passenger detected by the weight sensor. The memory may store the multiple control coefficients beforehand set depending on heights as the correlation values. In the control coefficient reading, the control circuit may read the control coefficient corresponding to the height of the passenger estimated by the estimator, from the multiple control coefficients.

Thereby, the height of the seated passenger is estimated from the weight of the passenger; the position of the head of the passenger is estimated from the estimated height; and thereby, the control signal is generated by use of the control coefficient corresponding to the position of the head. Accordingly, the noise can be effectively reduced at the position of the head of the seated passenger.

Furthermore, the height estimator may estimate the height of the passenger by use of the weight of the passenger detected by the weight sensor and a body mass index (BMI).

Thereby, the height of the passenger can be effectively estimated from the weight of the passenger.

Moreover, the height estimator may estimate the height of the passenger by identifying a height associated with the weight of the passenger detected by the weight sensor, where a height-weight relationship is expressed with BMI=23 in the body mass index.

Thereby, the height of the passenger can be effectively estimated from the weight of the passenger.

Besides, given that the height of the passenger to be used to control the output of the control signal to the control speaker is a height within a height range having a length of a first height to a second height inclusive and the height range is divided into N division ranges, the height estimator may identify N which satisfies a condition that a length of each of the N division ranges is equal to ¼ of a wavelength of an upper limit frequency among frequencies to be used for the control. The height estimator may identify a center value in a height division range as the height, the height division range corresponding to a weight range including the obtained weight of the passenger, the weight range being one among N weight ranges which are separated by a plurality of weights respectively associated with a plurality of boundary values between the N division ranges, where a height-weight relationship is expressed with BMI=23 in the body mass index.

Thereby, a single control coefficient can be used for each height range of ¼ of the wavelength of the upper limit frequency of the frequencies to be subjected to the control. Thus, it is possible to decrease the number of control coefficients to be stored in the memory. In addition, the upper and lower limit values are provided for the range of heights of passengers to be used for the control. Thereby, no noise reduction control is performed for a passenger with a height which makes the noise reduction effect on the passenger small. Accordingly, it is possible to prevent an inappropriate control for a passenger who is not a right person for the control, and to prevent damage to the control speakers.

In addition, the height estimator may use a first corresponding relationship between a height of 155 cm and a weight of 55 kg of a passenger, a second corresponding relationship between a height of 165 cm and a weight of 62.5 kg thereof, a third corresponding relationship between a height of 175 cm and a weight of 70.5 kg thereof, and a fourth corresponding relationship between a height of 185 cm and a weight of 78.5 kg thereof, where a height-weight relationship is BMI=23 in the body mass index. The height estimator may identify a center value of 160 cm between the height in the first corresponding relationship and the height in the second corresponding relationship as the height if the weight obtained from the weight sensor is 55 kg or greater but less than 62.5 kg. The height estimator may identify a center value of 170 cm between the height in the second corresponding relationship and the height in the third corresponding relationship as the height if the weight obtained from the weight sensor is 62.5 kg or greater but less than 70.5 kg. The height estimator may identify a center value of 180 cm between the height in the third corresponding relationship and the height in the fourth corresponding relationship as the height if the weight obtained from the weight sensor is 70.5 kg or greater but less than 78.5 kg.

Thereby, it is possible to appropriately reduce the noise depending on the height of the passenger, and to decrease the number of control coefficients to be stored in the memory.

Furthermore, the height estimator may use: a fifth corresponding relationship between a height of 155 cm and a weight 44 kg of a passenger, where a height-weight relationship is BMI=18.5 in the body mass index; a sixth corresponding relationship between a height of 160 cm and a weight of 59 kg thereof, where the height-weight relationship is BMI=23 in the body mass index; and a seventh corresponding relationship between a height of 170 cm and a weight of 72 kg thereof, and an eighth corresponding relationship between a height of 180 cm and a weight of 81 kg thereof, where the height-weight relationship is BMI=25 in the body mass index. The height estimator may identify the height of 160 cm in the sixth corresponding relationship as the height if the weight obtained from the weight sensor is 44 kg or greater but less than 59 kg. The height estimator may identify the height of 170 cm in the seventh corresponding relationship as the height if the weight obtained from the weight sensor is 59 kg or greater but less than 72 kg. The height estimator may identify the height of 180 cm in the eighth corresponding relationship as the height if the weight obtained from the weight sensor is 72 kg or greater but less than 81 kg.

Thereby, it is possible to appropriately reduce the noise depending on the height of the passenger, and to decrease the number of control coefficients to be stored in the memory.

Moreover, the control circuit does not have to output the control signal to the control speaker if the weight obtained from the weight sensor is less than a predetermined threshold.

Besides, the control circuit may stop its operation or shut down if the weight obtained from the weight sensor is less than a predetermined threshold.

In addition, the threshold may be 40 kg.

Thereby, no noise reduction control is performed for a passenger with a height which makes the noise reduction effect on the passenger small. Thus, it is possible to prevent inappropriate control for a passenger who is not a right person for the control, and to prevent damage on the control speakers. In addition, it is possible to reduce the energy consumption.

Furthermore, a noise control apparatus according to an aspect of the present disclosure is a noise control apparatus which reduces noise at a position away from a head of a passenger seated in a seat by a predetermined distance, the seat installed in a room under a noisy environment created by a predetermined noise source. The noise control apparatus includes: an obtainer which obtains passenger ticket information or boarding pass information about the passenger seated in the seat; a control speaker installed at a first position in the seat; a noise detector which detects the noise from the noise source, and outputs a noise signal representing the detected noise; a control circuit which obtains the noise signal outputted from the noise detector, and outputs a control signal to the control speaker, the control signal being that which reduces the noise at the position away from the head of the passenger by the predetermined distance; and a memory which stores a plurality of control coefficients respectively set at different values depending on heights, each control coefficient used to generate the control signal which reduces the noise at a position away from the head of a passenger with a corresponding height by a predetermined distance when the passenger gets seated in the seat. The control circuit detects a height of the passenger seated in the seat from the passenger ticket information or the boarding pass information obtained by the obtainer; reads the control coefficient corresponding to the detected height of the passenger from the memory; generates the control signal by use of the noise signal and the read control coefficient; and outputs the generated control signal to the control speaker.

Thereby, the control signal is generated by use of the control coefficient corresponding to the height of the seated passenger which is detected from the passenger ticket information or the boarding pass information about the passenger. Accordingly, it is possible to effectively reduce the noise at the position of the head of the seated passenger.

Moreover, in the height detection, the control circuit may detect the height of the passenger seated in the seat by: detecting an age and a sex of the passenger from the passenger ticket information or the boarding pass information obtained by the obtainer; and estimating the height from the detected age and sex.

Besides, in the height estimation, the control circuit may estimate the height of the passenger by: using a table of average heights of men and women by age; and identifying an average height which is associated in the table of average heights with the age and sex of the passenger detected in the height detection.

Thereby, the height of the seated passenger is estimated from the age and sex of the passenger which are detected from the passenger ticket information or the boarding pass information about the passenger, and the control signal is generated by use of the control coefficient corresponding to the estimated height. Accordingly, it is possible to effectively reduce the noise at the position of the head of the seated passenger. In addition, since only the minimum required passenger information is handled, this is desirable from a viewpoint of personal information protection.

In addition, if a seat in which the obtainer is installed is different from the seat associated in the passenger ticket information or the boarding pass information obtained by the obtainer, the control circuit may stop its operation in the seat in which the obtainer is installed, or shut down.

Thereby, if the seat in which the obtainer is installed is different from the seat associated in the passenger ticket information or the boarding pass information about the seated passenger, it is determined that the passenger is seated in a wrong seat, and no noise reduction operation is performed. Accordingly, it is possible to prevent inappropriate control for a passenger who is not a right person for the control, and to prevent damage to the control speakers. In addition, it is possible to reduce the energy consumption.

Furthermore, if a seat in which the obtainer is installed is different from the seat associated in the passenger ticket information or the boarding pass information obtained by the obtainer, the control circuit may cause the control speaker to output a warning sound or a voice message which informs the passenger that the passenger is seated in a wrong seat. If the seat in which the obtainer is installed is the same as the seat associated in the passenger ticket information or the boarding pass information obtained by the obtainer, the control circuit may cause the control speaker to output a welcome sound, or a gratefulness or greeting voice message which informs the passenger that the passenger is seated in a right seat.

Thereby, it is possible to inform the passenger that the passenger is seated in a wrong seat, or that the passenger is seated in a right seat. Accordingly, it is possible to prompt the passenger to get seated in the right seat.

Moreover, the noise control apparatus may further include a sound collector which is installed at a second position in the seat, and which collects the noise at the second position, the second position being different from the first position. Moreover, the control circuit may repeatedly obtain an output signal from the sound collector. In the control signal generation, the control circuit may adjust the control coefficient so as to minimize the obtained output signal, and repeatedly generates the control signal by use of the adjusted control coefficient, the control signal being that which reduces the noise at the position away from the head by the predetermined distance.

Thereby, all the control coefficients respectively corresponding to the heights of the passengers can be stored in the memory.

Embodiments described below are intended to discuss preferable specific examples of the present disclosure. Numerical values, shapes, materials, components, placement positions of the respective components, connections between the components, steps, step sequences, and the like in the following embodiments are just examples, and none of them do not limit the disclosure. The disclosure is limited by only the claims.

Out of the components in the following embodiments, components which are not described in the independent claims expressing the most generic concepts in the present disclosure are not necessarily needed to achieve of the object of the present disclosure, but are discussed as creating more preferable modes.

Embodiment 1

1-1. Configuration of Noise Control Apparatus

Descriptions will be provided for a configuration of a noise control apparatus 1 according to Embodiment 1.

Figure 1:
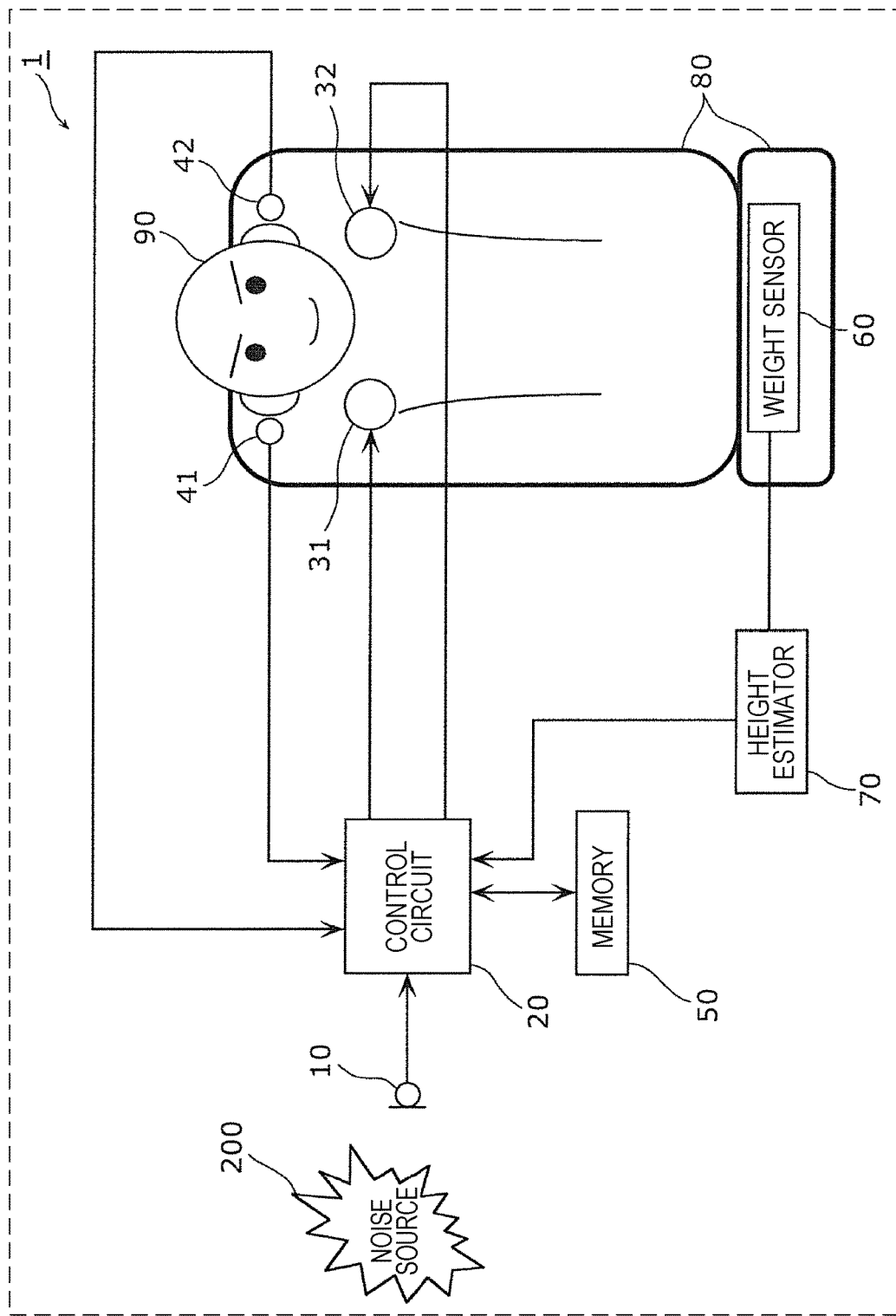
FIG. 1 is a block diagram illustrating an example of a configuration of a noise control apparatus according to Embodiment 1.

FIG. 1 is a diagram illustrating an example of the configuration of the noise control apparatus 1 according to Embodiment 1.

Figure 17:
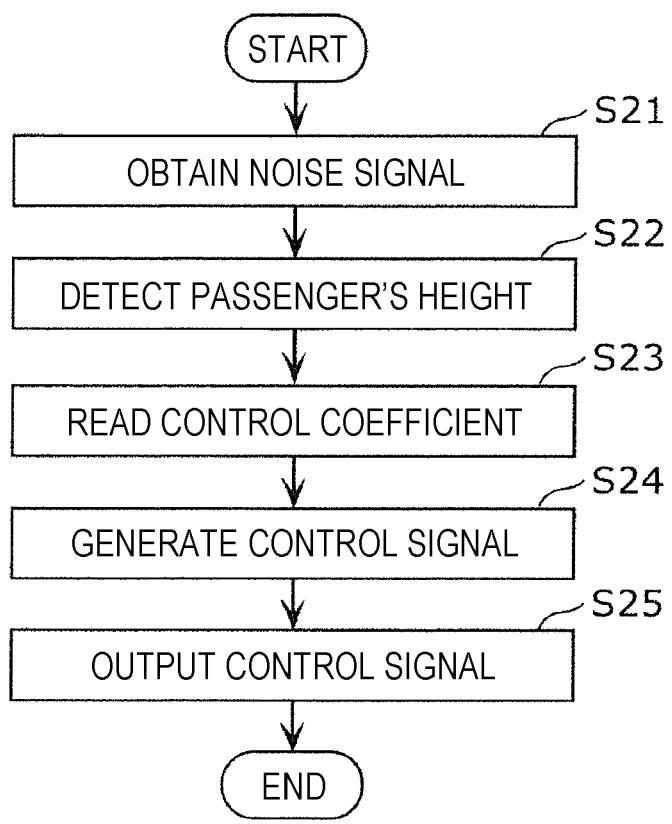
FIG. 17 is a flowchart illustrating an example of how a noise control apparatus according to Embodiment 2 works.

Like the noise control apparatus 100A illustrated in FIG. 17, the noise control apparatus 1 reproduces control sound from control speakers 31, 32 installed in a seat 80, and thereby reduces noise at positions as control points where sound collectors 41, 42 are arranged, as illustrated in FIG. 1.

The noise control apparatus 1 includes a noise detector 10, a control circuit 20, the control speakers 31, 32, a memory 50, a weight sensor 60, and a height estimator 70. The noise control apparatus 1 may further include the sound collectors 41, 42.

The noise detector 10 detects noise from a predetermined noise source 200, and outputs a noise signal representing the noise to the control circuit 20. The noise controller 10 is disposed near the predetermined noise source 200, and near the predetermined noise source 200, detects the noise produced by the predetermined noise 200. The predetermined noise source 200 is, for example, an engine of an automobile or an aircraft. In this case, the noise detector 10 is disposed at a position near the engine of the automobile or the aircraft. The noise detector 10 is implemented using, for example, a microphone.

The predetermined noise source 200 may be a source of noise whose occurrence position is not clear, for example, so-called running noise which is produced while a mixture of various vibrations, such as engine vibration, vehicle body vibration caused by shock from road surfaces, and vibration caused by friction between the vehicle body and the air, is propagating complicatedly through the vehicle body. In a case where the noise source is an unclear generation source of the so-called running noise or the like, the position of the noise detector 10 may be a position which has a relative high correlation with noise at the control points which are positions where the noise is reduced. Multiple noise sources may exist around the control points. Incidentally, FIG. 1 illustrates one noise source for the purpose of making the descriptions simple.

The control circuit 20 obtains the noise signal from the noise detector 10, and outputs a control signal to the control signals 31, 32. In this respect, the control signal is that which reduces the noise at a position away from the head of a passenger 90 seated in the seat 80 by a predetermined distance. The "position away from the head of a passenger 90 seated in the seat 80 by a predetermined distance" means, for example, a position which may be considered as being near the head of the passenger 90 seated in the seat 80. In other words, the control circuit 20 obtains the noise signal from the noise detector 10, and outputs to the control speakers 31, 32 the control signal which reduces the noise near the head of the passenger 90 seated in the seat 80. The control circuit 20 is implemented using, for example, a processor, a dedicated circuit, or the like. The control circuit 20's function of generating the control signal may be implemented using software or hardware.

The control speakers 31, 32 are installed in the seat 80. A position in the seat 80 where the control speakers 31, 32 are installed is referred to as a first position. The control speakers 31, 32 outputs control sound corresponding to the control signal outputted from the control circuit 20.

At the control points where the sound collectors 41, 42 are installed, the control sound outputted from the control speakers 31, 32 interferes with the noise propagating from the predetermined noise source 200. Thus, the sound collectors 41, 42 detect a difference between the control sound and the noise at the control points, and output an error single representing the detected difference to the control circuit 20. The sound collectors 41, 42 are installed in the seat 80. A position in the seat 80 where the sound collectors 41, 42 are installed is referred to as a second position. The second position is different from the first position where the control speakers 31, 32 are installed. The sound collectors 41, 42 are implemented using, for example, a microphone.

Based on the filtered-X LMS algorithm discussed using FIG. 18 or the multiple error LMS algorism discussed using FIG. 19, the control circuit 20 performs a control of making the control characteristic converge so as to minimize the error signal. In other words, the control circuit 20 performs the same control as the control circuit 120, or the same control as the control circuit 120A. Thus, the noise is reduced at the control points where the sound collectors 41, 42 are disposed.

Meanwhile, an improvement in the noise reduction effect for the passenger 90 seated in the seat 80 requires the control points to be set at the ears of the seated passenger 90. In other words, the improvement requires the sound collectors 41, 42 to be disposed at the ears of the seated passenger 90. The passenger 90 illustrated in FIG. 1 provides a case where a passenger as a reference is seated in the seat 80. In this case, the sound collectors 41, 42 are disposed at the ears of the seated passenger 90. Furthermore, in this case, the control speakers 31, 32 installed in the seat 80 are located near the head of the passenger 90.

Meanwhile, as discussed using FIG. 19, in a case where a passenger gets seated in the seat 80 with the ears of the passenger at positions different from those where the sound collectors 41, 42 are located when the control characteristic of the control circuit 20 is obtained, or at positions different from those of the ears of the passenger 90, that is to say, in a case where a passenger with a height different from that of the passenger 90 gets seated in the seat 80, the noise heard by the passenger with the height different from that of the passenger 90 cannot be effectively reduced. This is because: as the height difference between the passenger 90 and the passenger different from the passenger 90 becomes larger, the location of the sound collectors 41, 42 becomes farther from the ears of the passenger different from the passenger 90; and a reduction in the noise at the positions where the sound collectors 41, 42 are located does not necessarily means a reduction in the noise at the ears of the passenger different from the passenger 90. Depending on cases, there is likelihood that the output of the control sound effective for the passenger 90 produces an opposite effect, that is to say, an increase in noise heard by the passenger with the height different from that of the passenger 90.

In a case of a vehicle used for the public transportation, such as an aircraft and a railway train, which many people get onboard, effective use of energy (fuel) requires the total energy consumption in the vehicle as a whole to be limited within an acceptable range. For this reason, the aggregation of results from energy saving measures applied to the seats in the vehicle is important. An idea about the energy saving measures is, for example, that unnecessary energy is not used in a seat in which no passenger is seated. An application of this idea to the noise control apparatus 1 is that the noise control apparatus 1 does not perform the noise reduction control in the seat 80 in which no passenger is seated, that is to say, that noise control apparatus 1 does not reproduce the control signal from the control speakers 31, 32 which are installed in the seat 80, to reduce energy consumption. To put it specifically, the reproduction of no control signal from the control speakers 31, 32 may be achieved by the control circuit 20 outputting no control signal to the control speakers 31, 32. Otherwise, the reproduction of no control signal from the control speakers 31, 32 may be achieved by the control circuit 20 stopping its operation and turning off the power supply of the control circuit 20, that is to say, shutting down. The control circuit 20 can effectively reduce the power consumption by turning of the power supply.

To this end, using the weight sensor 60 installed in the seat 80, the control circuit 20 determines whether the passenger 90 is seated in the seat 80. For example, in a first condition where the weight sensor 60 detects a weight which is less than a predetermined threshold, the control is performed to turn off the power supply of the control circuit 20. In a second condition where the weight sensor 60 detects a weight which is equal to or greater than the predetermined threshold, the control is performed to turn on the power supply of the control circuit 20. In other words, in a case where the weight sensor 60 shifts from the first condition to the second condition, the power supply of the control circuit 20 is turned on. In a case where the weight sensor 60 shifts from the second condition to the first condition, the power supply of the control circuit 20 is turned off. Thus, while the weight sensor 60 remains in the first condition, the power supply of the control circuit 20 remains turned off. While the weight sensor 60 remains in the second condition, the power supply of the control circuit 20 remains turned on. Incidentally, the predetermined threshold is, for example, 40 kg.

It should be noted that: the control circuit 20 may include a monitor circuit which continues monitoring the condition of the weight sensor 60 even when the power supply is turned off; and the monitor circuit may control the power supply of the control circuit 20. In this case, even after the power supply of the control circuit 20 is turned off, the control circuit 20 continues consuming the electric power for the monitoring control to be performed by the monitoring circuit. Otherwise, the monitor circuit may be provided separately from the control circuit 20, instead of being included in the control circuit 20. One monitor circuit may be shared by multiple control circuits 20 respectively provided to multiple seats 80 such that based on detection results from the weight sensors 60 provided to the respective seats 80, the monitor circuit controls the turn on and off the power supplies of the multiple control circuits 20.

It should be noted that the control circuit 20 may reduce the power consumption by stopping the operations of an amplifier which drives the control speakers 31, 32, a signal processor which generates the control signal, and the like to generate no control signal, instead of turning on and off the power supply of the control circuit 20 as discussed above.

In this point, there is an idea about using an output signal for the power saving from the weight sensor 60 in order to estimate the positions of the ears of the passenger. To put it specifically, the control circuit 20 estimates the height of the passenger 90 by use of the height estimator 70 from the weight of the passenger 90 detected by the weight sensor 60, reads a control coefficient associated with the estimated height from the memory 50, and generates the control signal by use of the read control coefficient.

In this respect, the height estimator 70 estimates the height of the passenger depending on the weight of the passenger which is detected by the weight sensor 60. The height estimator 70 may be implemented using a processor, a memory which stores a predetermined program, and the like. Otherwise, the height estimator 70 may be implemented using a dedicated circuit.

The memory 50 stores multiple control coefficients respectively set at different values depending on weights or on correlation values correlating with the weights, each control coefficient used to generate a control signal which reduces the noise at a position which becomes higher in a height direction from the seat surface of the seat as the corresponding weight becomes heavier. The memory 50 stores, for example, the multiple control coefficients beforehand set depending on the heights as the correlation values.

From the memory 50, the control circuit 20 reads one of the multiple control coefficients, which corresponds to the correlation value correlating with the weight of the passenger detected by the weight sensor 60, to put it specifically, corresponds to the height of the passenger 90 estimated by the height estimator 70. The control circuit 20 generates the control signal by use of the noise signal outputted from the noise detector 10 and the read control coefficient, and outputs the generated control signal to the control speakers 31, 32.

Descriptions will be hereinbelow provided for this technical point, that is to say, how the control circuit 20 estimates a height from a weight.

FIG. 2 is a table excerpted from "Table 12 Height and Weight in Average and Standard Deviation—Age Class—Men and Women" in Ministry of Health, Labor and Welfare of Japan Annual Report "Health and Nutrition of Japanese People, Heisei Year 27 (2015)." In a case of airfare, an adult fare is usually applied to passengers who are 12 or more years old. With this taken into consideration, FIG. 2 lists the average heights and weights of men and women at the age of 12 to 19, 20s, 30s, 40s, 50s, and 60s. Men are denoted by reference signs M12, . . . , M20, M30, M40, M50 and M60 depending on their age, while women are denoted by reference sings W12, . . . , W20, W30, W40, W50 and W60 depending on their age. Incidentally, round numbers which are made by rounding off the average height and weight of women W20 to the nearest whole numbers are respectively equal to round numbers which are made by rounding off the average height and weight of women W30 to the nearest whole numbers. In other words, the average height and weight of women W20 are substantially equal to the average height and weight of women W30.

Figure 3A:
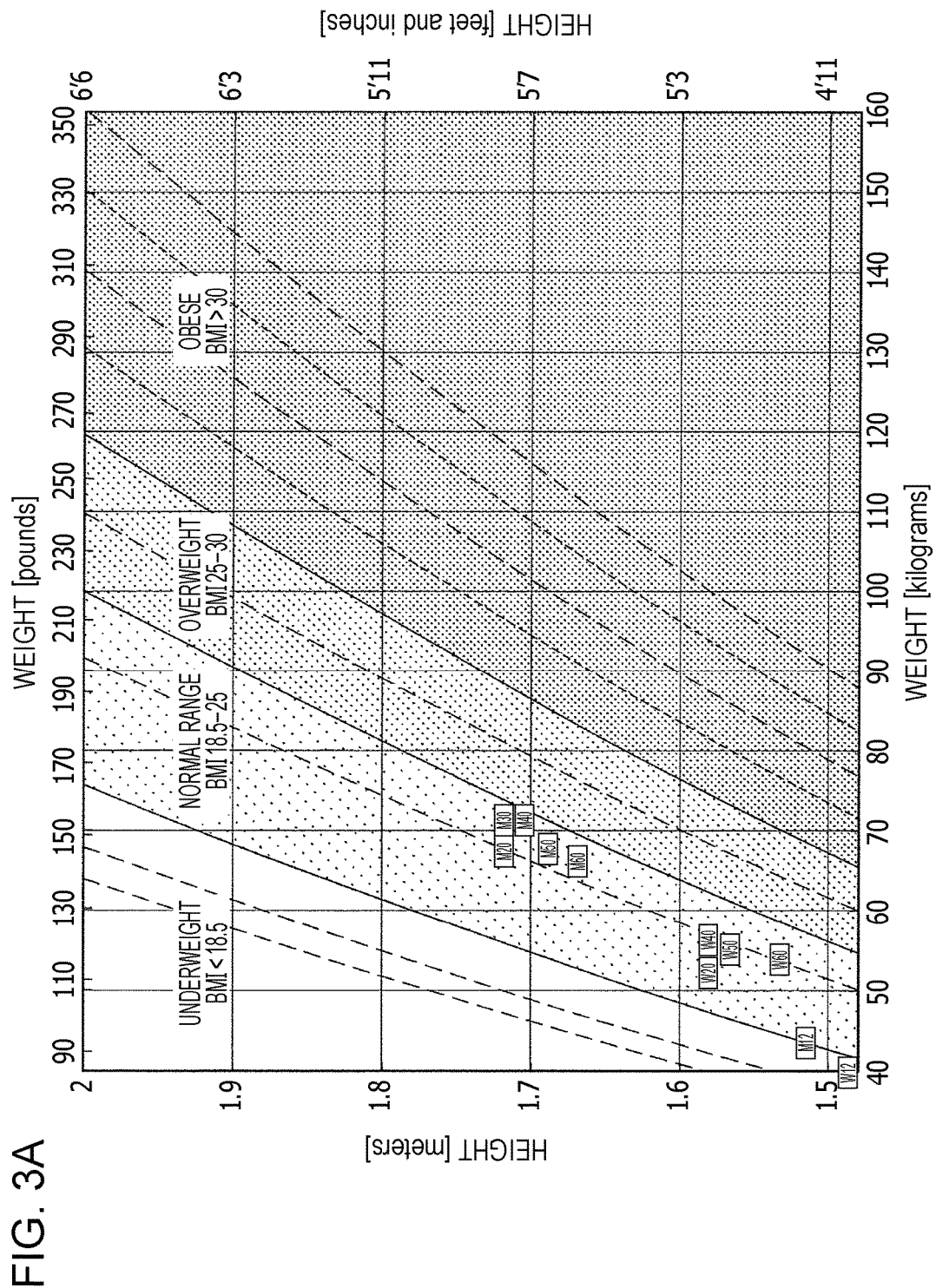
FIG. 3A is a chart of the body mass index (BMI) specified by the World Health Organization (WHO)
Figure 3B:
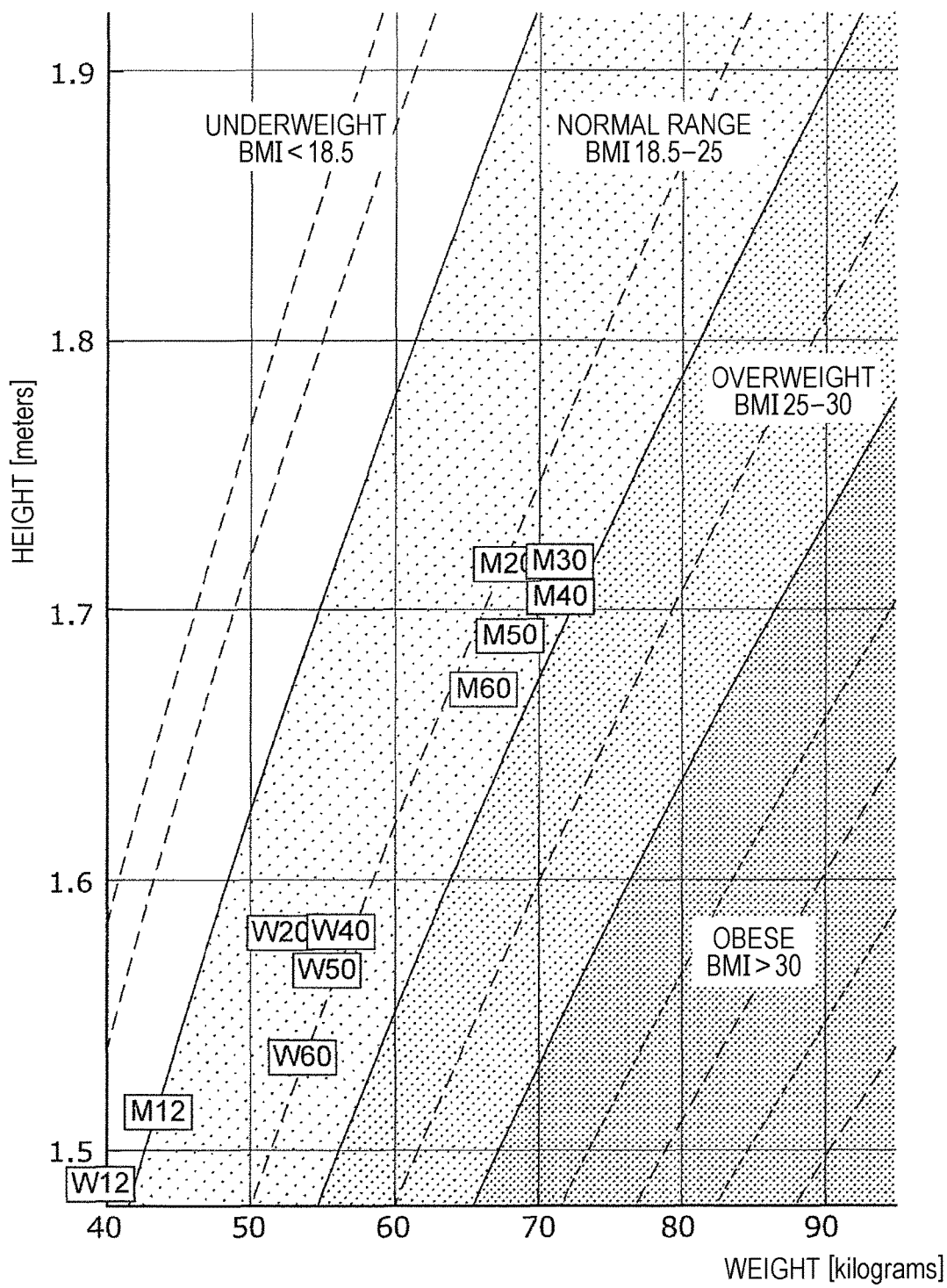
FIG. 3B is a partially-magnified chart of FIG. 3A.

FIG. 3A is a chart of the body mass index (BMI) specified by the World Health Organization (WHO). FIG. 3B is a partially-magnified chart of FIG. 3A. In FIGS. 3A and 3B, points representing the average heights and weights are provided with the reference signs depending on the sex and age.

As learned from these charts, the BMIs of men M12 and women W12 are located around the lower limit (BMI=18.5) of the normal range, while the BMIs of men and women at the age of 20s to 60s are inside the normal range. The dotted line in the normal range represents a height-weight relationship which satisfies BMI=23. The BMIs of adult men at the age of 20s and above are distributed in an area of BMI>23 (in the right of the dotted line), while the BMIs of adult women at the age of 20s and above are distributed in an area of BMI<23 (in the left of the dotted line). From these, one may consider that BMI=23 is a standard for men and women at the age of 20s and above.

FIG. 4 is a table excerpted from "Table 15-1 BMI in Japan—Age Class, Level of Obesity (by BMI Category), Population, Ratio—Total Population, Men and Women" in Ministry of Health, Labor and Welfare of Japan Annual Report "Health and Nutrition of Japanese People, Heisei Year 27 (2015)."

From FIG. 4, it is learned that regardless of the sex and age, the ratio of people whose BMIs fall within the normal range is approximately 70%.

Figure 5:
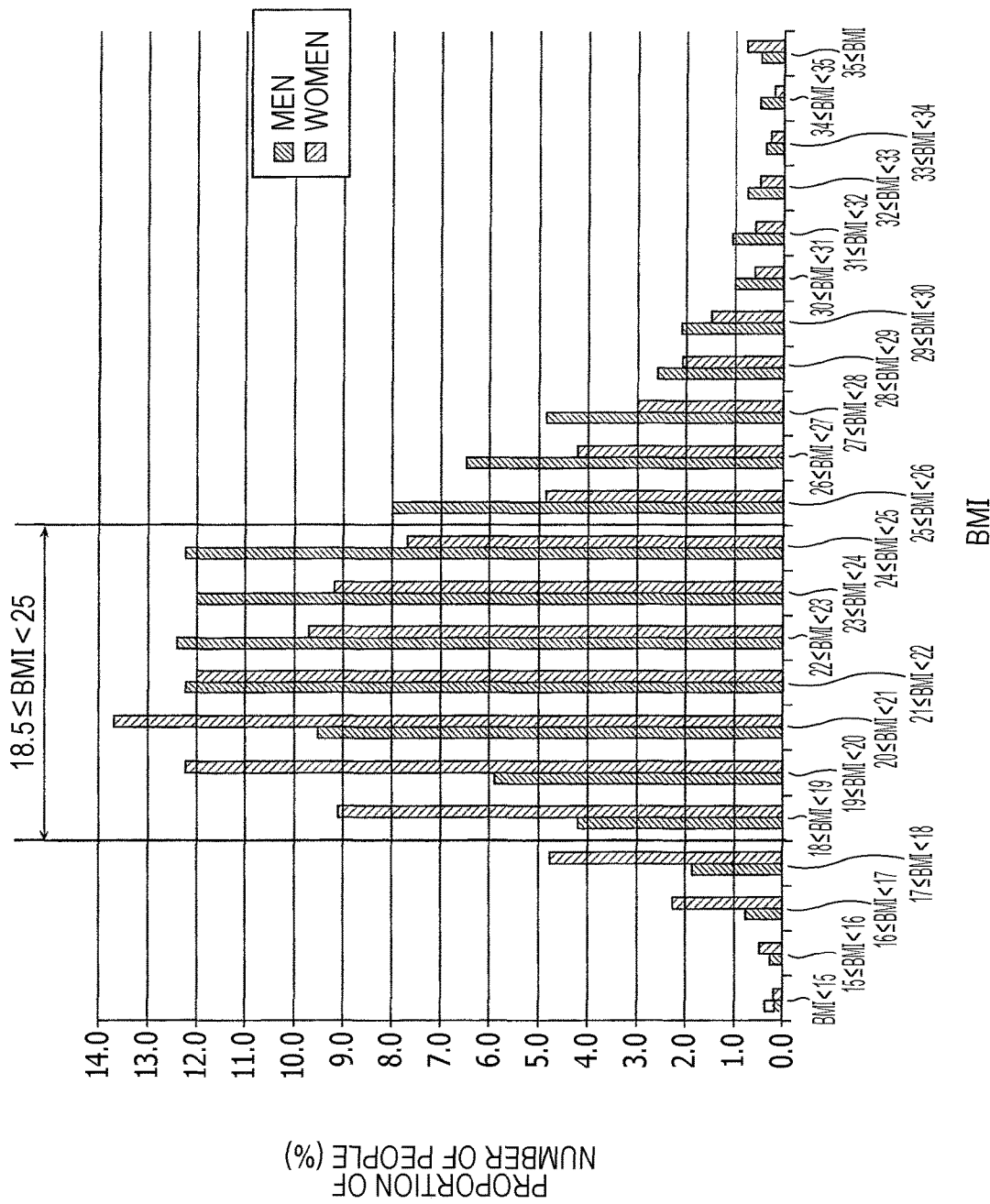
FIG. 5 is a graph illustrating BMI categories and the number of people in each BMI category which are based on "Table 14 BMI Distribution—BMI Category, Number of People and Ratio—Total Population, Men and Women" in Ministry of Health, Labor and Welfare of Japan Annual Report "Health and Nutrition of Japanese People, Heisei Year 27 (2015)"

FIG. 5 is a graph illustrating BMI categories and the ratio of people in each BMI category which are based on "Table 14 BMI Distribution—BMI Category, Number of People and Ratio—Total Population, Men and Women" in Ministry of Health, Labor and Welfare of Japan Annual Report "Health and Nutrition of Japanese People, Heisei Year 27 (2015)."

From FIG. 5, it is learned that most of the BMIs of men and women exist in the normal range.

In sum, from FIGS. 4 and 5, too, one may consider that there is no particular problem in using the dotted line satisfying BMI=23 as the standard.

The BMI is defined using $$BMI = w/h^2 \quad \text{(Equation 3)}$$

where w is a weight [kg], and h is a height [m].

For this reason, in the case of BMI=23, if the weight is known, the height can be obtained based on Equation 1, and by use of $$h = \sqrt{w/23} \quad \text{(Equation 4)}$$

Figure 6:
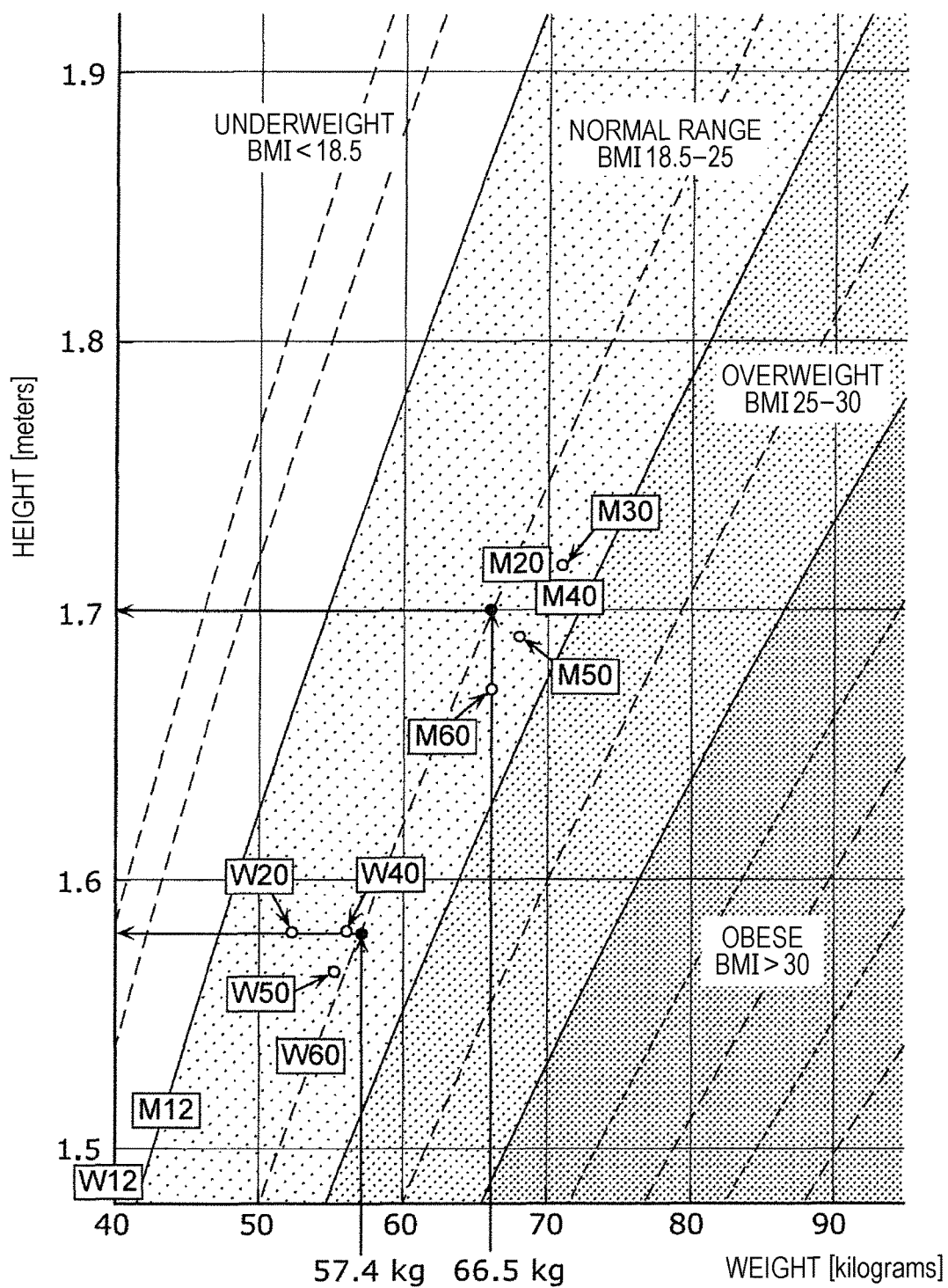
FIG. 6 is a chart illustrating an example of how to obtain a height from a weight by applying Equation 4 (that is to say, a dotted line representing BMI=23) to each of the adult men and women in FIG. 3A.

FIG. 6 is a chart illustrating an example of how to obtain a height from a weight by applying Equation 4 (that is to say, the dotted line representing BMI=23) to each of the adult men and women in FIG. 3A.

As illustrated in FIG. 6, when the height-weight relationship is expressed with BMI=23, a weight of 57.4 kg corresponds to a height of 158 cm, and one may consider that this weight and height combination is substantially equivalent to the physique of the adult women. In addition, when the height-weight relationship is expressed with BMI=23, a weight of 66.5 kg corresponds to a height of 170 cm, and one may consider that this weight and height combination is substantially equivalent to the physique of the adult men. Like this, the control circuit 20 is capable of uniquely obtaining a height from a weight obtained by the weight sensor 60 by performing a mathematical operation using Equation 4. The control circuit 20, therefore, may read a control coefficient corresponding to the calculated height from the memory 50, and generates a control signal by use of the read control coefficient. This makes it possible to realizing an appropriate noise reduction effect regardless of differences in height among passengers 90.

As discussed above, the height estimator 70 may estimate the height of the passenger 90 by use of the weight of the passenger 90 and the body mass index (BMI). To put it specifically, the height estimator 70 may estimate the height of the passenger 90 by identifying the height which is associated with the weight of the passenger 90 detected by the weight sensor 60, by use of the height-weight relationship satisfying BMI=23 in the body mass index.

1-2. Operation of Noise Control Apparatus

Next, descriptions will be provided for how the noise control apparatus 1 woks.

Figure 7:
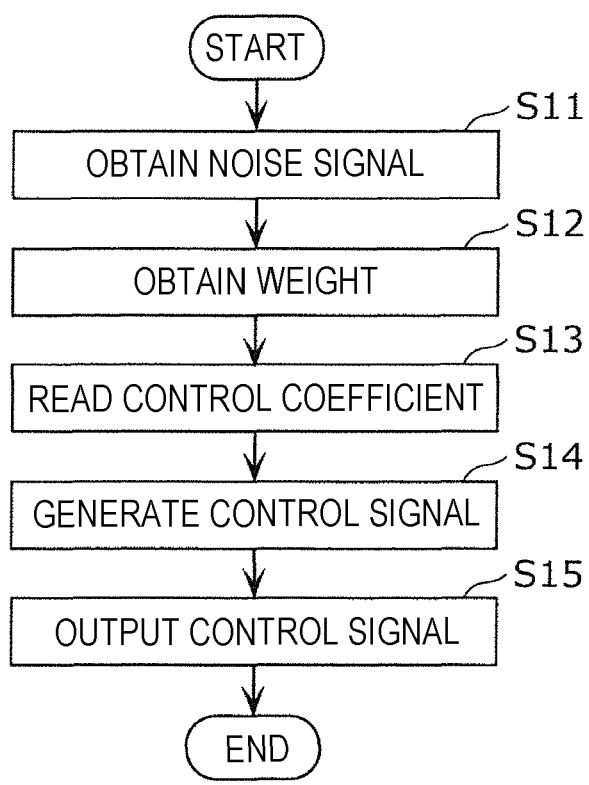
FIG. 7 is a flowchart illustrating an example of how the noise control apparatus according to Embodiment 1 works.

FIG. 7 is a flowchart illustrating an example of how the noise control apparatus according to Embodiment 1 works.

In the noise control apparatus 1, from the noise detector 10, the control circuit 20 obtains the noise signal representing the noise from the noise source (step S11).

From the weight sensor 60, the control circuit 20 obtains the weight of the passenger which is detected by the weight sensor 60 installed in the seat 80 (step S12).

From the memory 50, the control circuit 20 obtains the control coefficient corresponding to the correlation value correlating with the obtained weight of the passenger 90, which is one among the multiple control coefficients respectively set at different values depending on the correlation values (or heights) correlating with the weights, each control coefficient used to generate a control signal which reduces the noise at the position which becomes higher in the height direction from the seat surface of the seat 80 as the corresponding weight becomes heavier (step S13).

The control circuit 20 generates the control signal by use of the obtained noise signal and the read control coefficient (step S14).

The control circuit 20 outputs the generated control signal to the control speakers 31, 32 which are installed at the first position in the seat 80 (step S15).

1-3. Effects and the Like

In the noise control apparatus 1 according to Embodiment 1, the control circuit 20 obtains from the weight sensor 60 the weight of the passenger detected by the weight sensor 60, reads from the memory 50 the control coefficient corresponding to the correlation value correlating with the weight of the passenger, generates the control signal by use of the obtained noise signal and the read control coefficient, and outputs the generated control signal to the control speakers 31, 32.

Thereby, the control circuit 20 generates the control signal by use of the control coefficient which makes it possible to effectively reduce the noise at the position of the head of the seated passenger estimated from the weight of the passenger. The noise control apparatus 1, therefore, is capable of effectively reducing the noise at the position of the head of the seated passenger.

Furthermore, in the control coefficient reading, the control circuit 20 reads the control coefficient corresponding to the height of the passenger 90 estimated by the height estimator 70, which is one among the multiple control coefficients.

Thereby, the control circuit 20 estimates the height of the seated passenger from the weight of the passenger, and generates the control signal by use of the control coefficient corresponding to the estimated height. The noise control apparatus 1, therefore, is capable of effectively reducing the noise at the position of the head of the passenger with the estimated height when the passenger gets seated.

Moreover, the height estimator 70 estimates the height of the passenger 90 by use of the weight of the passenger 90 detected by the weight sensor 60, and the body mass index. The height estimator 70 estimates the height of the passenger 90, for example, by identifying the height which is associated with the weight of the passenger 90 detected by the weight sensor 60, by use of the height-weight relationship representing BMI=23 in the body mass index. Thereby, the height estimator 70 is capable of effectively estimating the height of the passenger from the weight of the passenger.

1-4. Modifications

1-4-1. Modification 1

In the method of estimating a height by use of only Equation 4 Embodiment 1, as the accuracy of the weight sensor 60 becomes higher, the number of outputted weight values becomes larger, and the number of estimated heights becomes larger. The number of control coefficients needed to be stored in the memory 50 corresponding to many heights accordingly becomes larger. This makes it difficult to reduce the size and cost of the memory 50.

With this taken into consideration, the number of control coefficients to be stored in the memory 50 may be limited by dividing identified heights into groups each having a predetermined range.

To put it specifically, the control of the long-wavelength low-frequency noise does not requires the control characteristics to be finely switched by each 1-cm height increments. The control of the long-wavelength low-frequency noise may be achieved by: dividing most expected heights of noise listeners, such as in a range of 155 to 185 cm, into several classes; and obtaining a control characteristic depending on a class.

For example, in a case where the most expected heights are divided into groups each having a 10-cm distance, a control characteristic different from the others is obtained for each 10-cm distance. Thereby a range of frequencies to be subjected to the noise control is determined with threshold frequencies that make a height not exceeding the 10-cm distance have the same control characteristic, or to put it differently that make a height exceeding the 10-cm distance have a different control characteristic. To put it specifically, in the noise control, frequencies considered as having the same characteristic are frequencies with a wavelength less than $\lambda/4$, where $\lambda$ is a wavelength [m]. This is because frequencies in a frequency bandwidth with a wavelength longer than this wavelength may be considered as having the same phase (at least not having a reverse phase). Thus, in a case where 10 cm is equal to $\lambda/4$, the wavelength is calculated at 0.4 m. In this respect, a relationship among the speed of sound, a frequency and a wavelength is expressed with $$v = f\lambda \qquad \text{(Equation 5)}$$

where v is the speed of sound [m/second], f is a frequency [Hz] and $\lambda$ is a wavelength [m].

In a case where the wavelength is 0.4 m, the frequency is calculated at 850 Hz by use of Equation 5 since the speed of sound (at normal temperature) is 340 m. Thus, in the case of the division into the groups each having the 10-cm distance, the frequency band to be subjected to the noise control covers a range up to 850 Hz. The upper limit of the frequencies to be subjected to the noise control is usually approximately 500 Hz. For this reason, one may consider that there is no particular problem in dividing into the groups each having the 10-cm distance.

With this taken into consideration, heights are divided into three classes: Class A covering a height range of 155 to 165 cm, Class B covering a height range of 165 to 175 cm, and Class C covering a height range of 175 to 185 cm. In this case, the control characteristic of Class A is determined by being beforehand measured with the ears of a 160-cm-tall passenger regarded as the control points, since 160 cm is a median of the heights belonging to Class A. Similarly, the control characteristic of Class B is determined by being beforehand measured with the ears of a 170-cm-tall passenger regarded as the control points. The control characteristic of Class C is determined by being beforehand measured with the ears of a 180-cm-tall passenger regarded as the control points. The control coefficients representing these control characteristics are stored in the memory 50. The control circuit 20, therefore, may have a configuration in which when a passenger actually gets seated in the seat 80, the height of the passenger is estimated depending on the weight of the passenger detected by the weight sensor 60 and based on the above-mentioned classifications, and the control coefficient corresponding to the estimated height is read from the memory 50.

Figure 8:
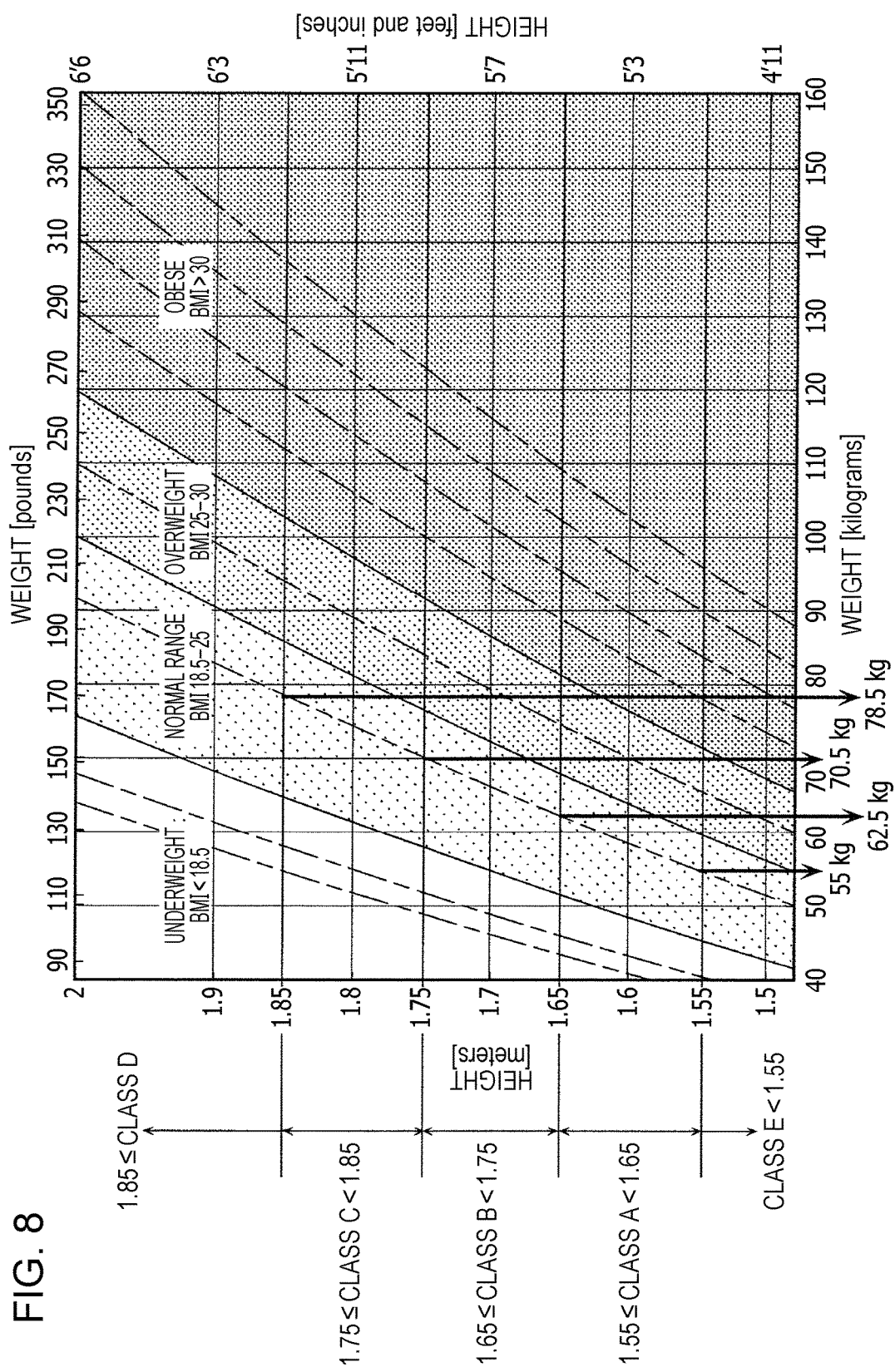
FIG. 8 is a body mass index chart where detection thresholds by weight at which height classes are separated from one another are illustrated.

FIG. 8 is a body mass index chart where detection thresholds by weight at which the height classes are separated from one another are illustrated. FIG. 8 illustrates weight thresholds corresponding to Classes A to C into which the heights are divided as discussed above. Incidentally, FIG. 8 also illustrates weight thresholds corresponding to Classes D, E in addition to the thresholds corresponding to Classes A to C.

Class A is a height division range of 155 to 165 cm. Thus, thresholds at which to separate Class A from the other classes are 155 cm and 165 cm. A weight corresponding to one threshold of 155 cm is 55 kg. Similarly, a weight corresponding to the other threshold of 165 cm is 62.5 kg.

Class B is a height division range of 165 to 175 cm. Thus, the thresholds at which to separate Class B from the other classes are 165 cm and 175 cm. The weight corresponding to the threshold of 165 cm has been discussed above. A weight corresponding to the other threshold of 175 cm is 70.5 kg.

Class C is a height division range of 175 to 185 cm. Thus, the thresholds at which to separate Class C from the other classes are 175 cm and 185 cm. The weight corresponding to the threshold of 175 cm has been discussed above. A weight corresponding to the other threshold of 185 cm is 78.5 kg.

Thus, in a case where a value detected by the weight sensor 60 is 55 kg or more but less than 62.5 kg, the height estimator 70 determines that the height of the passenger 90 belongs to Class A, and identifies a center value in the Class A division range, or a height of 160 cm, as the height of the passenger 90. Similarly, in a case where a value detected by the weight sensor 60 is 62.5 kg or more but less than 70.5 kg, the height estimator 70 determines that the height of the passenger 90 belongs to Class B, and identifies a center value in the Class B division range, or a height of 170 cm, as the height of the passenger 90. Furthermore, similarly, in a case where a value detected by the weight sensor 60 is 70.5 kg or more but less than 78.5 kg, the height estimator 70 determines that the height of the passenger 90 belongs to Class C, and identifies a center value in the Class C division range, or a height of 180 cm, as the height of the passenger 90. As discussed above, the height estimator 70 limits the height to be identified to 160 cm, 170 cm and 180 cm which are the representative values of Classes A to C, and the control circuit 20 selects a control characteristic corresponding to one of 160 cm, 170 cm and 180 cm which is identified by the height estimator 70. For this reason, the storage capacity of the control coefficients in the memory 50 can be reduced to a large extent.

In sum, given that the height of the passenger to be used to control the output of the control signal to the control speakers 31, 32 is a height within a height range having a length of a first height (for example, 155 cm) to a second height (for example, 185 cm) inclusive and the height range is divided into N (for example, 3) division ranges, the height estimator 70 identifies N which satisfies a condition that a length of each of the N division ranges is equal to ¼ of a wavelength λ of an upper limit frequency among frequencies to be used for the control. In other words, the height estimator 70 identifies N by use of $$(\text{Second Height} - \text{First Height})/N = \lambda/4 \qquad \text{(Equation 6)}$$

Thereby, the height estimator 70 identifies a center value in a height division range as the height, the height division range corresponding to a weight range including the obtained weight of the passenger, the weight range being one among N weight ranges which are separated by multiple weights respectively associated with multiple boundary values between the N division ranges, where the height-weight relationship is expressed with BMI=23 in the body mass index.

Thereby, a single control coefficient can be used for each height range of ¼ of the wavelength of the upper limit frequency of the frequencies to be subjected to the control. Thus, it is possible to decrease the number of control coefficients to be stored in the memory. In addition, the upper and lower limit values are provided for the range of heights of passengers to be used for the control. Thereby, no noise reduction control is performed for a passenger with a height which makes the noise reduction effect on the passenger small. Accordingly, it is possible to prevent an inappropriate control for a passenger who is not a right person for the control, and to prevent damage to the control speakers 31, 32.

To put it specifically, in identifying the height to generate the control signal, the height estimator 70 identifies the height by use of a first corresponding relationship between a height of 155 cm and a weight of 55 kg of the passenger, a second corresponding relationship between a height of 165 cm and a weight of 62.5 kg thereof, a third corresponding relationship between a height of 175 cm and a weight of 70.5 kg thereof, and a fourth corresponding relationship between a height of 185 cm and a weight of 78.5 kg thereof, where the height-weight relationship is BMI=23 in the body mass index. For example, if the weight obtained from the weight sensor 60 is 55 kg or greater but less than 62.5 kg, the height estimator 70 identifies a center value of 160 cm between the height in the first corresponding relationship and the height in the second corresponding relationship as the height. Furthermore, for example, if the weight obtained from the weight sensor 60 is 62.5 kg or greater but less than 70.5 kg, the height estimator 70 identifies a center value of 170 cm between the height in the second corresponding relationship and the height in the third corresponding relationship as the height. Moreover, for example, if the weight obtained from the weight sensor 60 is 70.5 kg or greater but less than 78.5 kg, the height estimator 70 identifies a center value of 180 cm between the height in the third corresponding relationship and the height in the fourth corresponding relationship as the height.

This makes it possible to appropriately reduce the noise depending on the height of the passenger, and to reduce the number of control coefficients to be stored in the memory.

1-4-2. Modification 2

Modification 1 has discussed the case of the division into the classes each having the 10-cm distance. In contrast, a class division may be achieved by: as discussed above using FIG. 5, obtaining the wavelength expressed with λ/4 from the upper limit value of the frequency to be subjected to the noise control; and obtaining a distance D[m] covered by each class using $$D = \lambda/4 = v/4f. \qquad \text{(Equation 7)}$$

When the upper limit value of the frequency to be subjected to the noise control is 500 Hz, the distance D is calculated at 17 cm using Equation 7. In this case, the control coefficient corresponding to each class may use one obtained using a median between the thresholds which separate the class from the other classes, like in the case of FIG. 8.

In Modification 1, the height to be used for the control is limited to the range equal to or greater than 155 cm but less than 185 cm. In a case where heights less than 155 cm or heights equal to or greater than 185 cm are intended to be used for the control, the height estimator 70 may determine that the height of the passenger 90 belongs to Class D if the value of detected by the weight sensor 60 is equal to 78.5 kg or greater. Accordingly, the control circuit 20 may generate the control signal by use of the control coefficient, for example, determined by being beforehand measured using a height of 190 cm corresponding to Class D. Furthermore, the height estimator 70 may determine that the height of the passenger 90 belongs to Class E if the value of detected by the weight sensor 60 is less than 55 kg. Accordingly, the control circuit 20 may generate the control signal by use of the control coefficient, for example, determined by being beforehand measured using a height of 150 cm corresponding to Class E. This case, however, increases load on the control speakers 31, 32. For this reason, the prerequisite for the case is that there is no problem with the input resistance of the control speakers 31, 32.

Figure 9:
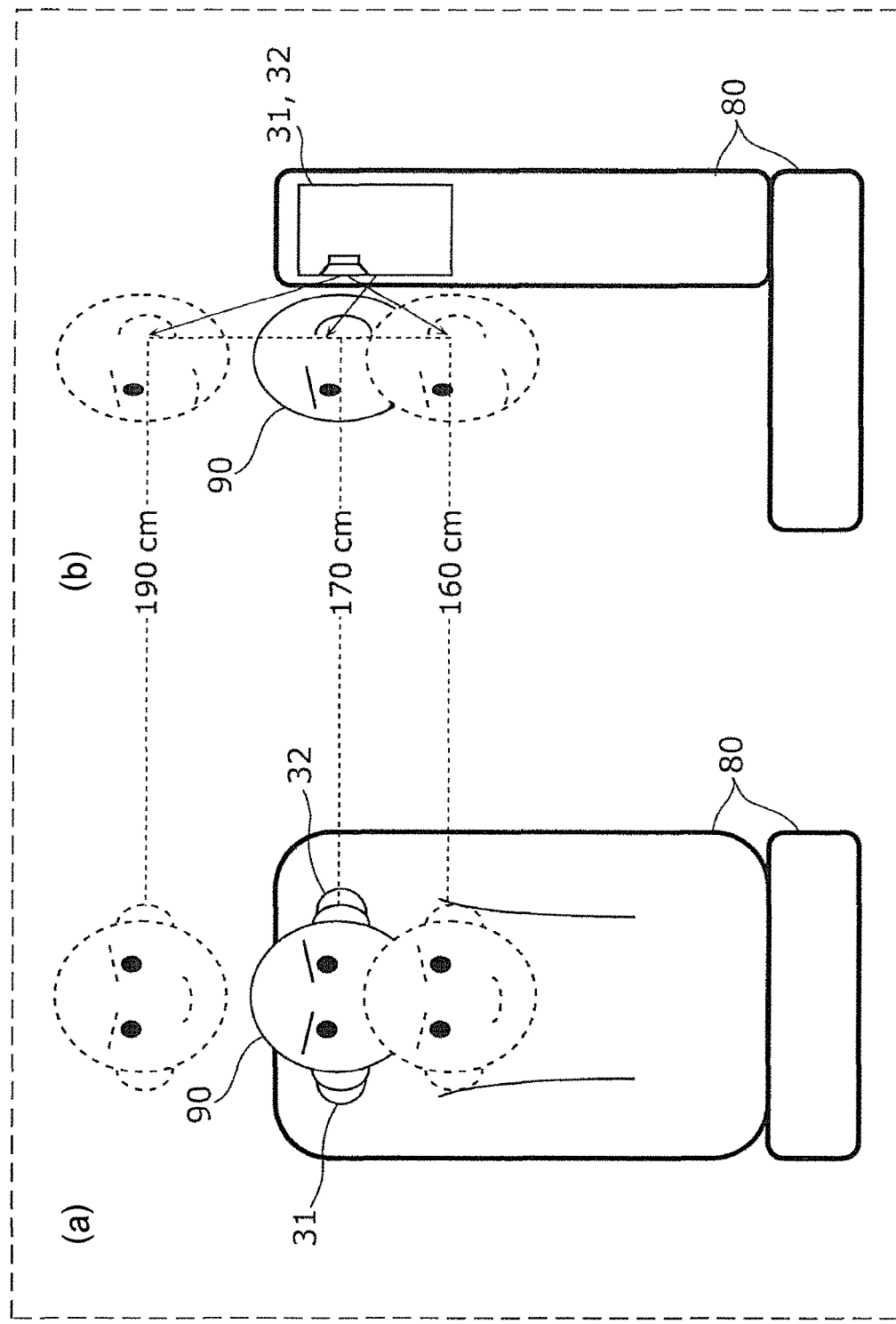
FIG. 9 illustrates diagrams for explaining a positional relationship between control speakers and the ears of a passenger.

FIG. 9 illustrates diagrams for explaining a positional relationship between the control speakers and the ears of the passenger.

FIG. 9(*a*) is a diagram of the passengers 90 seated in the seat 80 as seen from the front of the seat 80. FIG. 9(*b*) is a diagram of the passengers 90 seated in the seat 80 as seen from a side of the seat 80. In addition, FIG. 9 illustrates the 170-cm-tall passenger 90 seated there with the positions of the ears of the passenger 90 coinciding with the center position of the control speakers 31, 32. The 170-cm-tall passenger is drawn with solid lines, while the 160-, and 190-cm-tall passengers 90 are drawn with dotted lines.

Let us assume that when the 170-cm-tall passenger 90 is seated in the seat 80, the distance from the control speakers 31, 32 to the ears of the passenger 90 is, for example, 5 cm.

Figure 10:
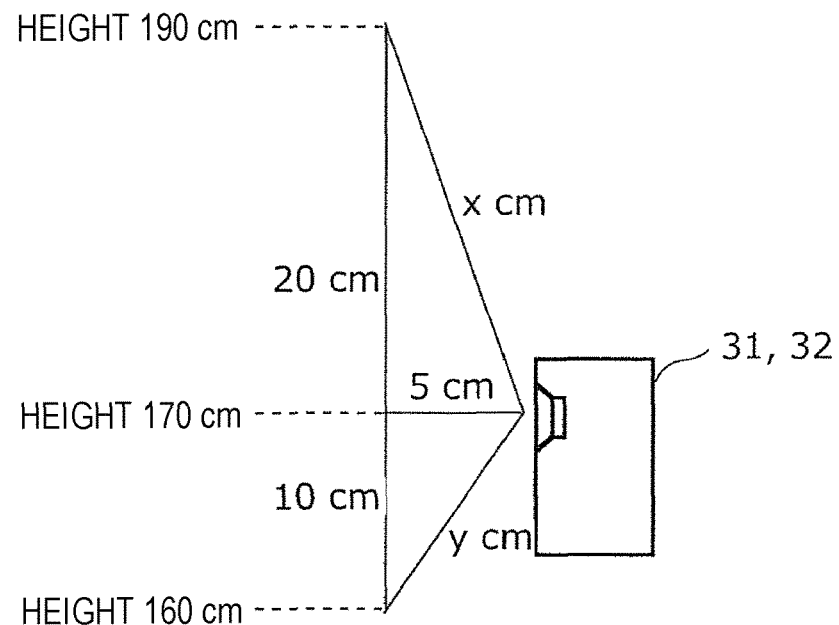
FIG. 10 is a diagram for explaining a distance relationship between the control speakers and the ears of each of 160-, 170- and 190-cm-tall passengers in FIG. 9(b)

FIG. 10 is a diagram for explaining a distance relationship between the control speakers and the ears of each of the 160-, 170- and 190-cm-tall passengers in FIG. 9(*b*).

In FIG. 10, the positions of the control speakers 31, 32 and the positions of the ears of each of the 160-, 170- and 190-cm-tall passengers in FIG. 9(*b*) are arranged such that a right-angled triangle is formed among their positions. Using this arrangement, FIG. 10 illustrates the lengths of the sides of the triangle. Based on the Pythagorean theorem, a distance x between the control speakers 31, 32 and the ears of the 190-cm-tall passenger 90, and a distance y between the control speakers 31, 32 and the ears of the 160-cm-tall passenger 90 are calculated using $$x=\sqrt{((5\times5)+(20\times20))}\approx20.6 \text{ cm}$$

and $$y=\sqrt{((5\times5)+(10\times10))}\approx11.2 \text{ cm}. \qquad \text{(Equation 8)}$$

Figure 11:
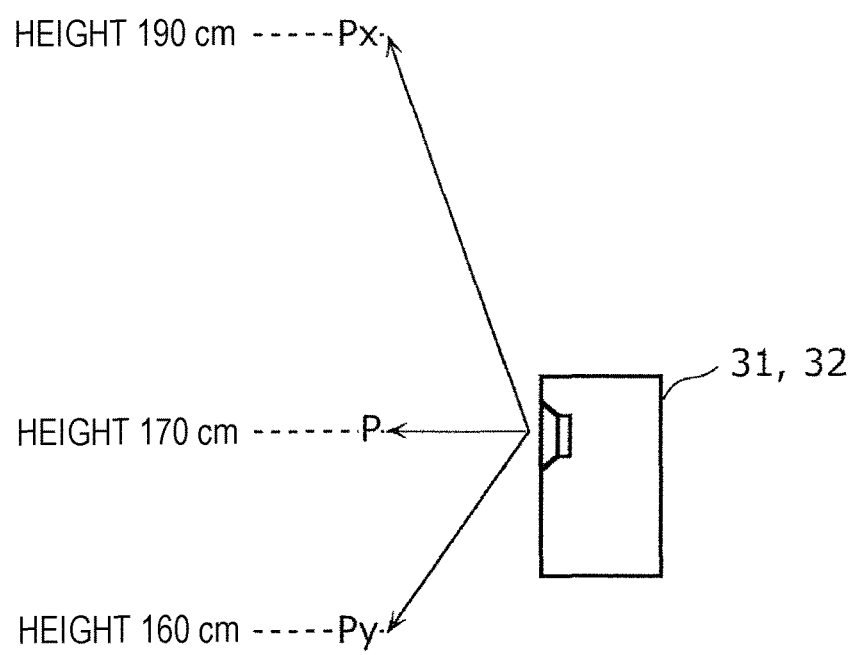
FIG. 11 is a diagram illustrating a sound pressure level at the ears of each of the 160-, 170- and 190-cm-tall passengers of sound from the control speakers in FIG. 10.

FIG. 11 is a diagram illustrating a sound pressure level at the ears of each of the 160-, 170- and 190-cm-tall passengers of sound from the control speakers in FIG. 10.

As illustrated in FIG. 11, the sound pressure level Px at the ears of the 190-cm-tall passenger 90, and the sound pressure level Py at the ears of the 160-cm-tall passenger 90 are calculated respectively using $$Px=P/(20.6/5)^2\approx P/17$$

and $$Py=P/(11.2/5)^2\approx P/5. \qquad \text{(Equation 9)}$$

where p is the sound pressure level at the ears of the 170-cm-tall passenger 90 of sound reproduced from the speakers.

It should be noted that the sound reproduced from the control speakers 31, 32 are low-frequency sound, and a level of directivity of the reproduced sound is not high. With this taken into consideration, let us assume that the source of the sound is a point sound source. Equation 9 tells that when the levels of the respective signals inputted into the control speakers 31, 32 are equal to each other, the sound pressure level Py at the ears of the 160-cm-tall passenger 90 is approximately ⅕ of the sound pressure level P at the ears of the 170-cm-tall passenger 90. Similarly, Equation 9 tells that when the levels of the respective signals inputted into the control speakers 31, 32 are equal to each other, the sound pressure level Px at the ears of the 190-cm-tall passenger 90 is approximately 1/17 of the sound pressure level P at the ears of the 170-cm-tall passenger 90. Noise is usually distributed evenly inside the room, and the noise level is not largely different among any places inside the room. For this reason, the control sound at the same level needs to be reproduced at the ears of the 170-cm-tall passenger 90, at the ears of the 160-cm-tall passenger 90, and at the ears of the 190-cm-tall passenger 90. To put it specifically, in a case where the same noise reduction effect as at the ears of the 170-cm-tall passenger 90 is intended to be produced at the ears of the 160-cm-tall passenger 90, the level of the control signal inputted into the control speakers 31, 32 needs to be made approximately 5 times higher. Similarly, in a case where the same noise reduction effect as at the ears of the 170-cm-tall passenger 90 is intended to be produced at the ears of the 190-cm-tall passenger 90, the level of the control signal inputted into the control speakers 31, 32 needs to be made approximately 17 times higher. At this point, if the input resistance of the control speakers 31, 32 is vulnerable, the sound reproduced from the control speakers 31, 32 are distorted, and no normal noise reduction effect can be obtained. In addition, there is a risk that the control speakers 31, 32 cannot withstand the sound pressure, and is accordingly damaged. Furthermore, even though the control speakers 31, 32 suffer from no problem at the beginning, continual inputs of the control signals with a large sound pressure into the control speakers 31, 32 cause a problem, such as damage to the control speakers 31, 32 due to their deterioration with time.

Against this background, with taken into consideration the installation condition, speaker characteristics, input resistance and the like of the control speakers 31, 32, for example, heights categorized into Class D and Class E in FIG. 8 may be excluded from those to be used for the control if there is a risk that the above problems occur. To put it specifically, the control circuit 20 may be configured to perform no noise reduction control in a case where a weight detected by the weight sensor 60 is less than 55 kg, or equal to or greater than 78.5 Kg. Otherwise, the control circuit 20 may be configured to perform a control of putting no control signal to the control speakers 31, 32, or to shut down, in this case.

1-4-3. Modification 3

The below-discussed classification may be employed instead of the above-discussed classification.

Figure 12:
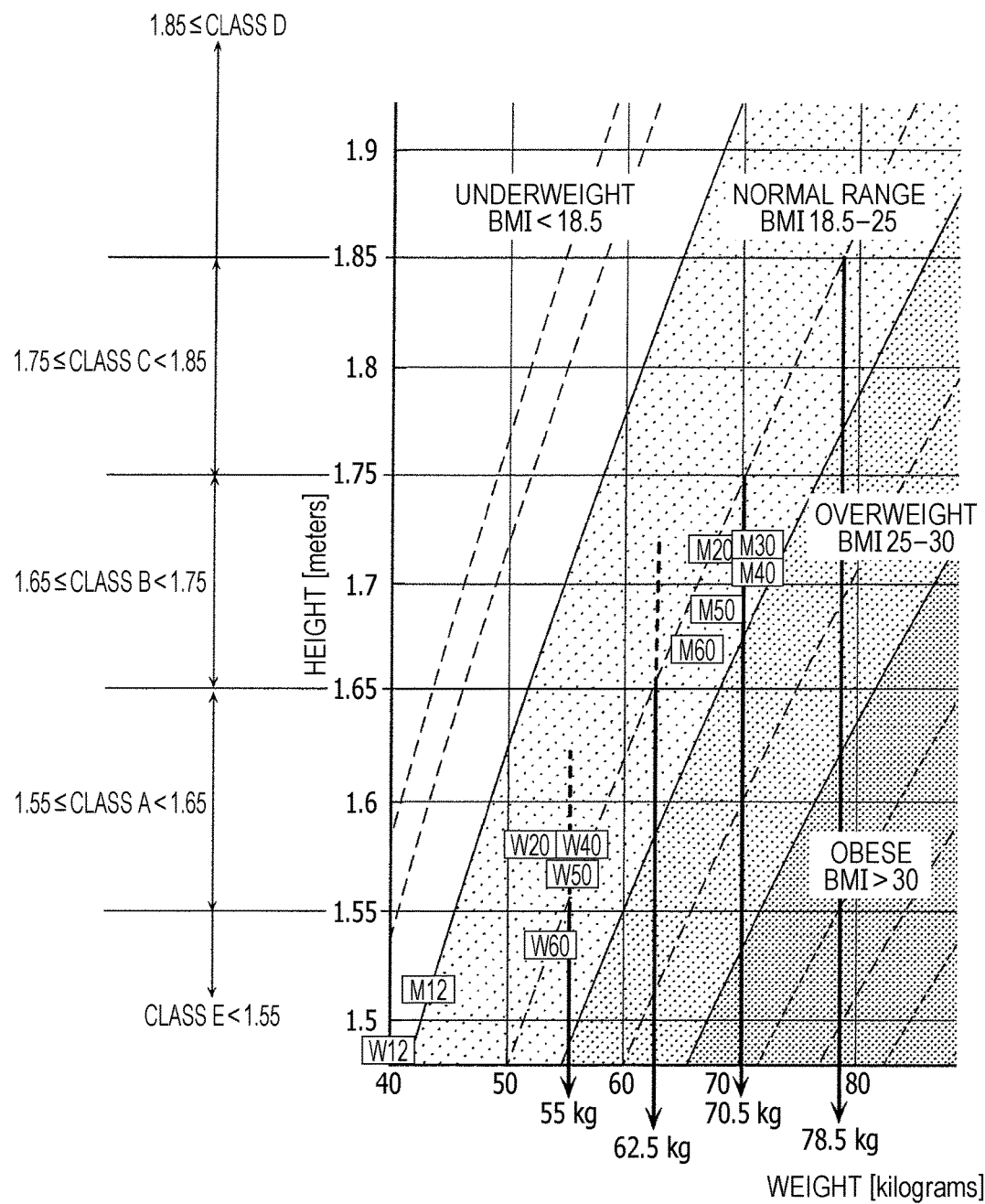
FIG. 12 is a chart obtained by adding reference signs representing sex and age in FIG. 3B to FIG. 8.

FIG. 12 is a chart obtained by adding the reference signs representing the sex and age in FIG. 3B to FIG. 8.

From FIG. 12, women W40 at the age of 40s and women W50 at the age of 50s are determined as belonging to Class A, and a control characteristic of 160 cm is set for them without problem. In contrast, women W20 at the age of 20s and women W30 at the age of 30s are determined as belonging to Class E although they are almost as tall as women W40, and a control signal corresponding to a control characteristic appropriate for them is not outputted. Instead, a control signal corresponding to a control characteristic of 150 cm is outputted for them. Meanwhile, women W12 at the age of 12 and women W60 at the age of 60s are correctly determined as belonging to Class E, and a control signal corresponding to a control characteristic of 150 cm appropriate for them is generated for them.

Similarly, men M20 at the age of 20s, men M50 at the age of 50s, and men M60 at the age of 60s are determined as belonging to Class B, and a control signal corresponding to a control characteristic of 170 cm appropriated from them is generated for them. In contrast, men M30 at the age of 30s and men M40 at the age 40s are determined as belonging to Class C although their heights are close to 170 cm, and a control signal corresponding to a control characteristic of 180 cm is generated for them. Furthermore, men M12 at the age of 12 are largely different from adult men, and are rather close to adult women, in terms of the height-weight relationship. Men M12 at the age of 12 are correctly determined as belonging to Class E, and a control signal corresponding to a control characteristic of 150 cm appropriate for him is generated for him.

As discussed above, the classification in FIG. 8 is likely to produce control signals corresponding to inappropriate control characteristics. With this taken into consideration, Class E is cancelled, and women whose weights are less than 62.5 kg are categorized into Class A. This modification improves the classification such that as for women W20 at the age of 20s and women W30 at the age of 30s, a control signal corresponding to a control characteristic of 160 cm appropriate for them is generated. Incidentally, as for men M12 at the age of 12, women W12 at the age of 12 and women W60 at the age of 60s, a control signal corresponding to a control characteristic of 160 cm inappropriate for them is generated. One may consider, however, that the improvement to the control signal generation for women W20 at the age of 20s and women W30 at the age of 30s is preferable because this improvement is applicable to women at the age of 20s and 30s who potentially use airlines more frequently.

1-4-4. Modification 4

Modification 3 cannot improve the control signal generation for men M30 at the age of 30s and men M40 at the age of 40s. A classification using a different method may be employed.

From FIG. 3B discussed above, it is learned that adult men are distributed around a height of 171 cm while adult women are distributed around a height of 158 cm. On the other hand, the height difference between women at the age of 12 and adult women is approximately 8 cm, while the height different between men at the age of 12 and adult men is close to 20 cm. With this taken into consideration, FIG. 13 is obtained by additionally plotting men and women at the age of 13 to 19 on FIG. 3B by referring to FIG. 2.

Figure 13:
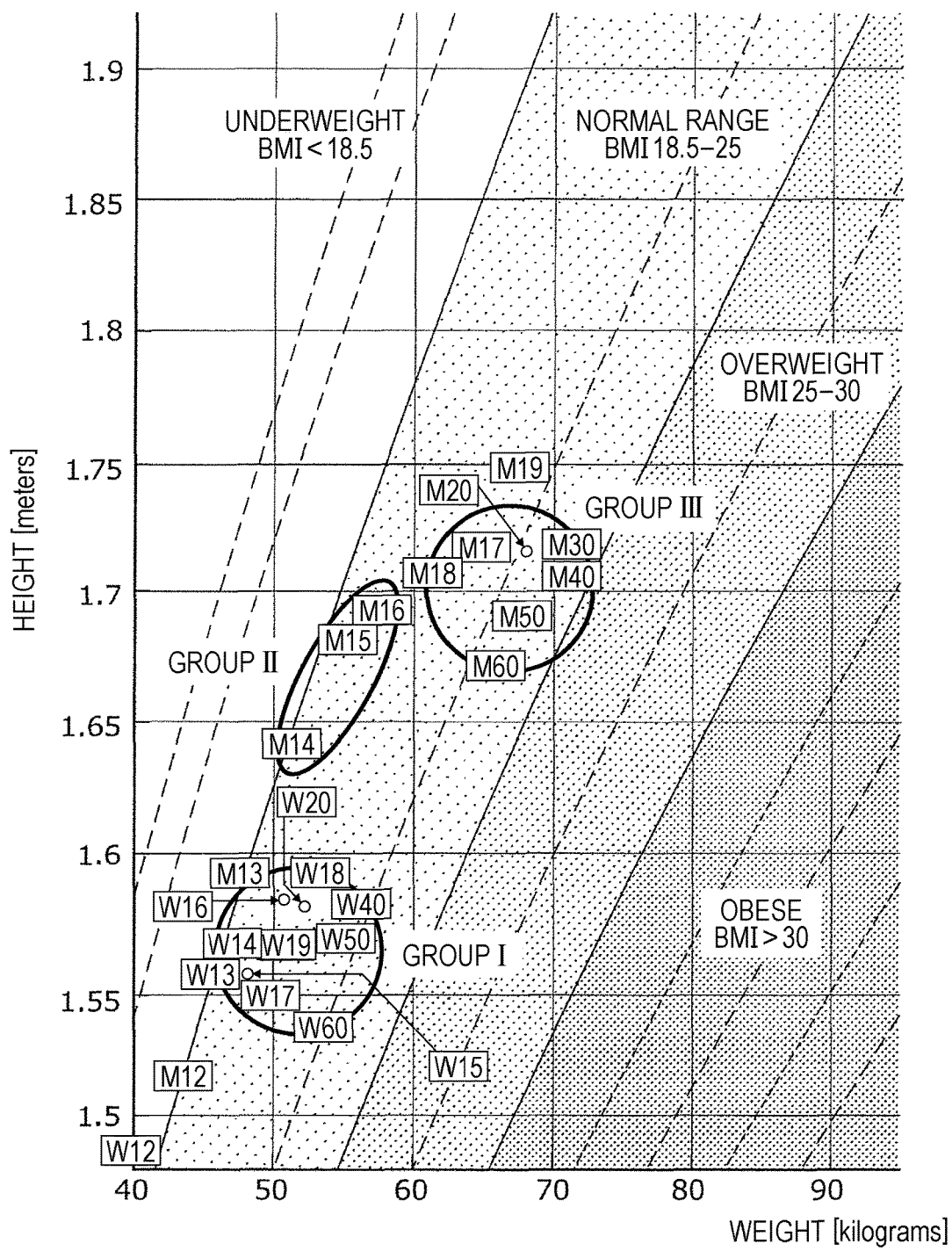
FIG. 13 is a chart obtained by: additionally plotting average heights and weights of men and women at the age of 13 to 19 on FIG. 3B; and providing the plotted points with corresponding reference signs.

FIG. 13 is a chart obtained by: additionally plotting average heights and weights of men and women at the age of 13 to 19 on FIG. 3B; and providing the plotted points with corresponding reference signs. Reference signs for men at the age of 13 to 19 are M13 to M19, while reference signs for women at the age of 13 to 19 are W13 to W19.

As learned from FIG. 13, almost all the average heights of the women fall within a height range of 156 to 158 cm, while almost all the average weights of the women fall a weight range of 46 kg to 55 kg. This woman group is referred as Group I. Meanwhile, men are not largely different from women in terms of the average height at the age of 12 and 13, but grow larger at the age of 14 to 16 in a way that their difference from their woman counterparts increases. The average physiques of men at the age of 17 to 19 are almost the same as those of adult men. With this taken into consideration, men at the age of 14 to 16 are categorized into Group II, while men at the age of 17 and above are categorized into Group III. In other words, men and women at the age of 13 to 60s can be divided into the three groups: Groups I to III.

It should be noted that: both men and women at the age of 12 deviated from Group I; and men and women at the age of 12 and under had better be excluded from those for whom the control is provided. On the other hand, in a case where the control is provided to men and women at the age of 13 and above, men at the age of 13 are included in Group I.

Figure 14:
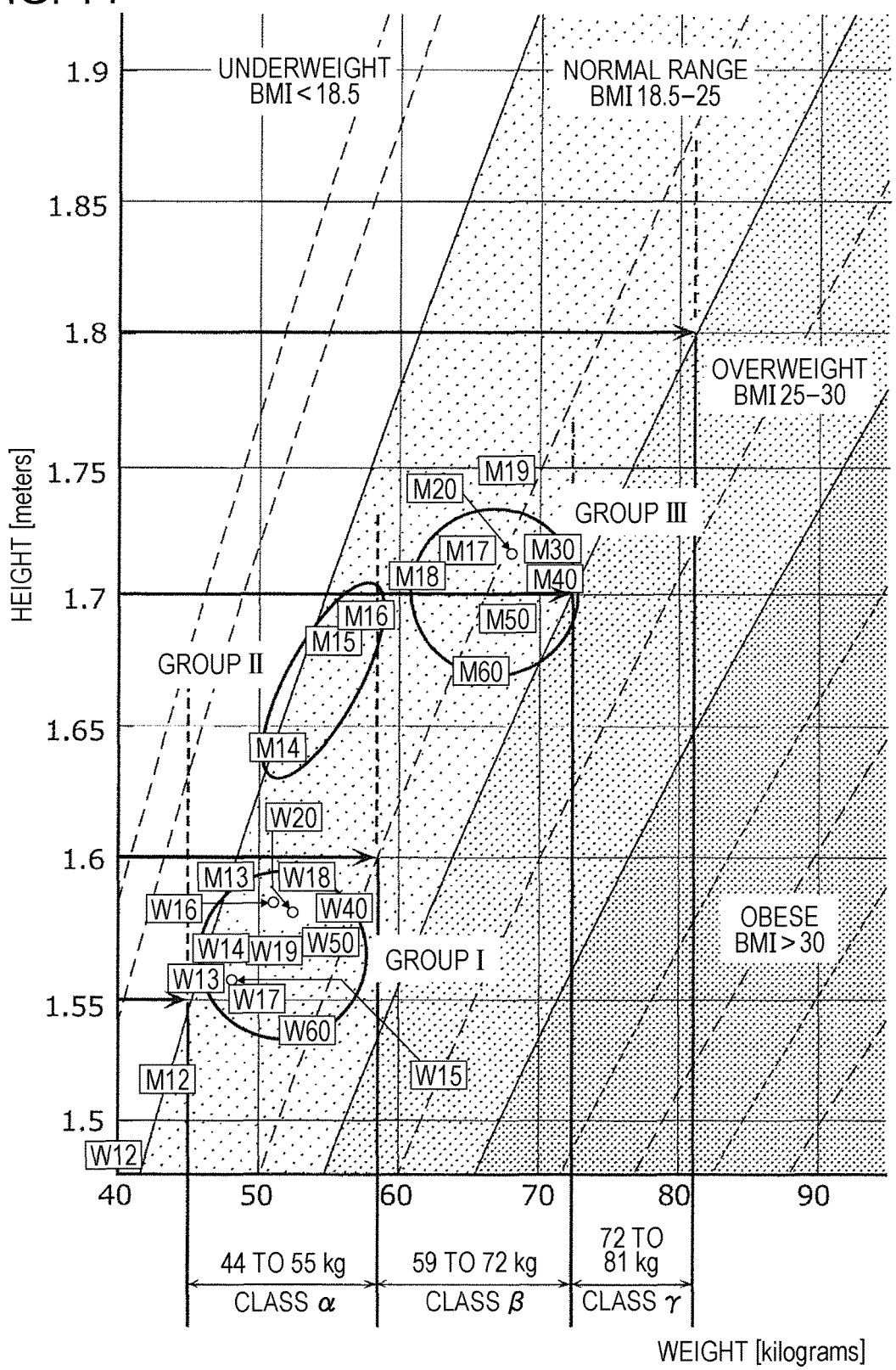
FIG. 14 is a chart illustrating a weight classification with Groups I to III taken into consideration.

FIG. 14 is a chart illustrating a weight classification with Groups I to III taken into consideration.

Class α covers passengers each with a weight of 44 kg or greater but less than 59 kg. Class β covers passengers each with a weight of 59 kg or greater but less than 72 kg. Class γ covers passengers each with a weigh equal to 72 kg or greater but less than 81 kg. Classes α, β, γ are set as follows. A weight of 44 kg is that corresponding to a height of 155 cm when BMI=18.5. A weight of 59 kg is that corresponding to a height 160 cm when BMI=23. A weight of 72 kg is that corresponding to a height of 170 cm when BMI=25. A weight of 81 kg is that corresponding to a height of 180 cm when BMI=25.

In this classification, BMI is set at a larger value as the height becomes higher. This setting is made with taken into consideration the distribution of adult women in the area of BMI<23 (in the left of the dotted line) and the distribution of adult men in the area of BMI>23 (in the right of the dotted line), which have been discussed above. Since many men are taller than women, Class γ is set as a natural extension to Class β. The control circuit 20 generates a control signal corresponding to a control characteristic of 160 cm in a case where a weight detected by the weight sensor 60 belongs to Class α. The control circuit 20 generates a control signal corresponding to a control characteristic of 170 cm in a case where a weight detected by the weight sensor 60 belongs to Class β. The control circuit 20 generates a control signal corresponding to a control characteristic of 180 cm in a case where a weight detected by the weight sensor 60 belongs to Class γ.

In sum, in identifying a height to generate a control signal, the control circuit 20 identifies the height by use of: a fifth corresponding relationship between the height of 155 cm and the weight 44 kg of a passenger, where the height-weight relationship is BMI=18.5 in the body mass index; a sixth corresponding relationship between the height of 160 cm and the weight of 59 kg thereof, where the height-weight relationship is BMI=23 in the body mass index; and a seventh corresponding relationship between the height of 170 cm and the weight of 72 kg thereof, and an eighth corresponding relationship between the height of 180 cm and the weight of 81 kg thereof, where the height-weight relationship is BMI=25 in the body mass index. For example, the control circuit 20 identifies the height of 160 cm in the sixth corresponding relationship as the height in a case where the weight obtained from the weight sensor 60 is 44 kg or greater but less than 59 kg. In addition, for example, the control circuit 20 identifies the height of 170 cm in the seventh corresponding relationship as the height in a case where the weight obtained from the weight sensor 60 is 59 kg or greater but less than 72 kg. Furthermore, the control circuit 20 identifies the height of 180 cm in the eighth corresponding relationship as the height in a case where the weight obtained from the weight sensor 60 is 72 kg or greater but less than 81 kg.

Thus, since all the passengers in Group I fall inside Class α, a control characteristic of 160 cm appropriate for them is selected. In addition, since all the passengers in Group II fall inside Class β, a control characteristic of 170 cm appropriate for them is selected. Incidentally, men M15 and men M16 in Group II are determined as belonging to Class α, and a control characteristic of 160 cm inappropriate for them is selected. However, men M15 and men M16 are in the process of growth, and the control characteristic of 160 cm selected for them is an exceptional value. Furthermore, from a viewpoint of the airliner use, priority has to be given to adult women. For these reason, the control characteristic of 160 cm is selected for Class α.

In this respect, no control characteristic is defined for passengers each with a weight of less than 44 kg, and passengers each with a weight of 81 kg or greater. Passengers each with a weight of less than 44 kg are considered as children at the age of 11 or under, and are accordingly not considered as main airliner users. For this reason, there is no problem in excluding these passengers from beneficiaries of the noise control. Furthermore, since the height of each such passenger is less than 150 cm, the head of the passenger is away from the control speakers 31, 32 in a lower direction, and the distance of the control speakers 31, 32 to the ears of the passenger is long. For these reasons, it is difficult to perform the noise control for a passenger with a weight of less than 44 kg, and such a passenger is excluded from the beneficiaries of the control.

Similarly, since the heights of passengers each with a weight of 81 kg or greater are close to 190 cm, the head of each such passenger is away from the control speakers 31, 32 in an upper direction, and the distance of the control speakers 31, 32 to the ears of the passenger is long. For these reasons, it is difficult to perform the noise control for a passenger with a weight of 81 kg or greater, and such a passenger is excluded from the beneficiaries of the control.

Of course, depending on the seat size, the installation positions of the control speakers, and the like, there is a case where the control can be performed for a passenger with a height of 190 cm. In such a case, for example, a control characteristic of 190 cm may be set for the passenger by determining that the passenger belongs to Class γ which covers passengers each with a height of 81 kg or greater but less than 90 kg.

Since as discussed above, adult men and women who are the main airliner users are divided into the respective groups and heights are estimated using the BMI based on the two groups, control characteristics appropriate for actual heights can be selected, and an appropriate noise reduction effect can be accordingly provided for passengers.

1-4-5. Modification 5

In Embodiment 1 given above and its Modifications 1 to 4, the height estimator 70 performs the process of estimating the height of the passenger 90 from the weight detected by the weight sensor 60, and the control circuit 20 performs the process of generating the control signal. Instead, however, a single processor unit may be configured to perform the two processes. In other words, the processor unit may be implemented using a processor and a memory, or a dedicated circuit.

1-4-6. Modification 6

In Embodiment 1 given above and its Modifications 1 to 4, the memory 50 stores the multiple control coefficients which are beforehand set depending on the heights. The memory 50 is not limited to this configuration. The memory 50 may store the multiple control coefficients which are beforehand set depending on the weights. In this case, the control circuit 20 reads a control coefficient corresponding to the weight of the passenger 90 detected by the weight sensor 60 from the memory, generates a control signal by use of the read control coefficient, and outputs the generated control signal to the control speakers 31, 32. Even in the case where the control coefficient is directly read based on the weight, the noise can be effectively reduced at the position of the head of the seated passenger since the memory 50 stores the multiple control coefficients respectively set at different values depending on the weights, each control coefficient used to generate a control signal which reduces the noise at the position which becomes higher in the height direction from the seat surface of the seat as the corresponding weight becomes heavier.

It should be noted that although Embodiment 1 given above and its Modifications 1 to 6 have been discussed using the case where the seats are aircraft seats, Embodiment 1 given above and its Modifications 1 to 6 are applicable to other vehicles such as a train and an automobile.

Embodiment 2

2-1. Configuration of Noise Control Apparatus

Descriptions will be provided for a configuration of a noise control apparatus 1A according to Embodiment 2.

Figure 15:
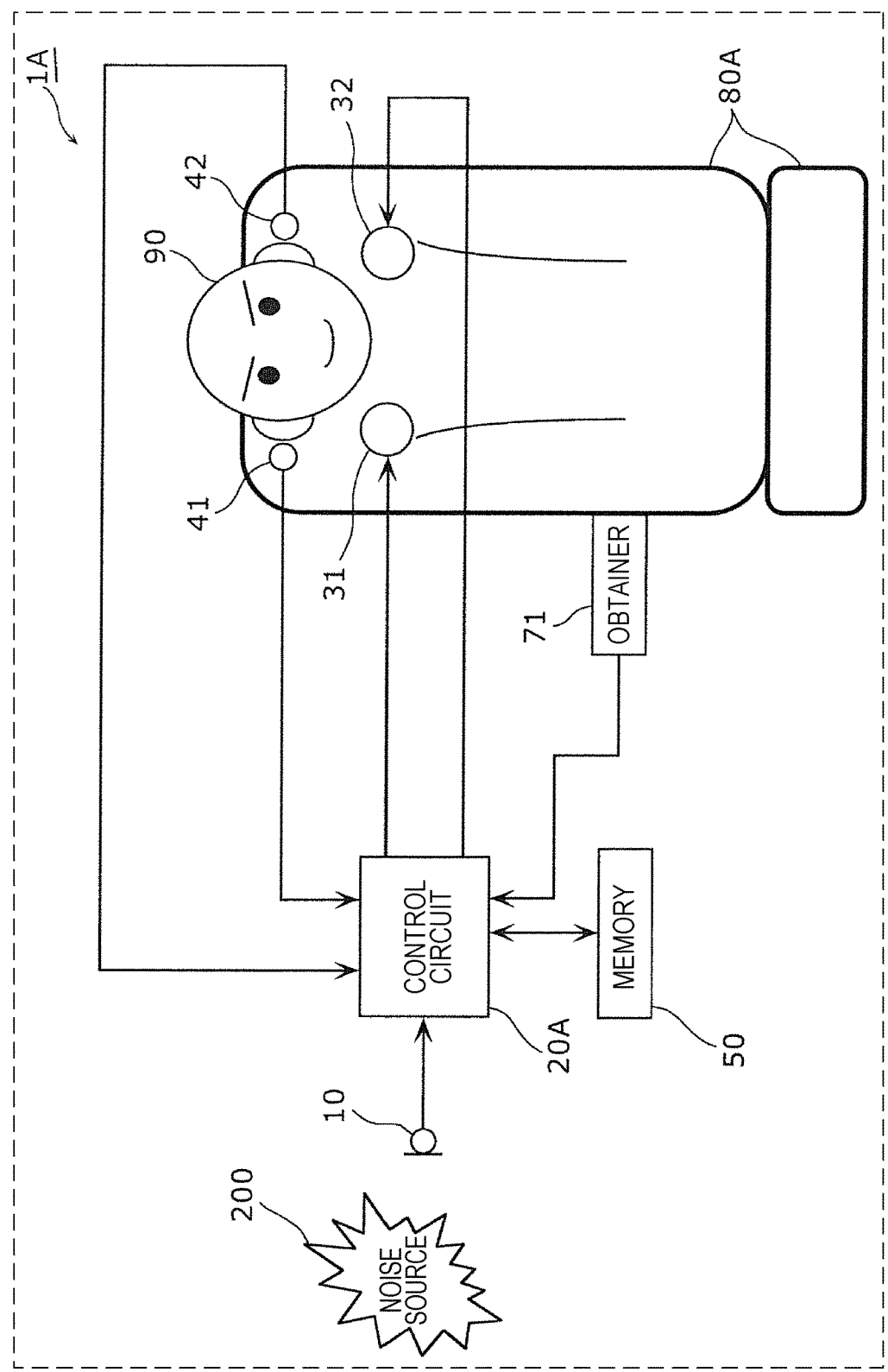
FIG. 15 is a diagram illustrating an example of a configuration of a noise control apparatus according to Embodiment 2.

FIG. 15 is a diagram illustrating an example of the configuration of the noise control apparatus according to Embodiment 2.

As illustrated in FIG. 15, the noise control apparatus 1A reduces the noise at the control points, that is to say, at the ears of the passenger 90 by reproducing the control sound from the control speakers 31, 32 which is installed in a seat 80A in an aircraft, like the noise control apparatus 1 illustrated in FIG. 1. The noise control apparatus 1A is different from the noise control apparatus 1 according to Embodiment 1 in that the noise control apparatus 1A includes a obtainer 71 instead of the weight sensor 60, and a control circuit 20A which performs a control different from that of the control circuit 20. To put it specifically, although the noise control apparatus 1 according to Embodiment 1 estimates the height of the passenger 90 from the weight of the passenger 90 obtained from the weight sensor 60, the noise control apparatus 1A according to Embodiment 2 reads passenger ticket information or boarding pass information by use of the obtainer 71, and detects height information from the passenger ticket information or the boarding pass information, and generates a control signal depending on the height information.

The obtainer 71 obtains the passenger ticket information or the boarding pass information about the passenger 90 seated in the seat 80A. The obtainer 71 may be a reader which obtains the passenger ticket information or the boarding pass information by reading an IC chip embedded in a passenger ticket or a boarding pass, or things, such as a two-dimensional bar code and a one-dimensional bar code, printed on a passenger ticket or a boarding pass. The obtainer 71 may be a device which obtains the passenger ticket information or the boarding pass information beforehand inputted in the passenger ticket or the boarding pass from a different information terminal or a server via a network when the passenger 90 purchases the passenger ticket or the boarding pass.

Figure 16:
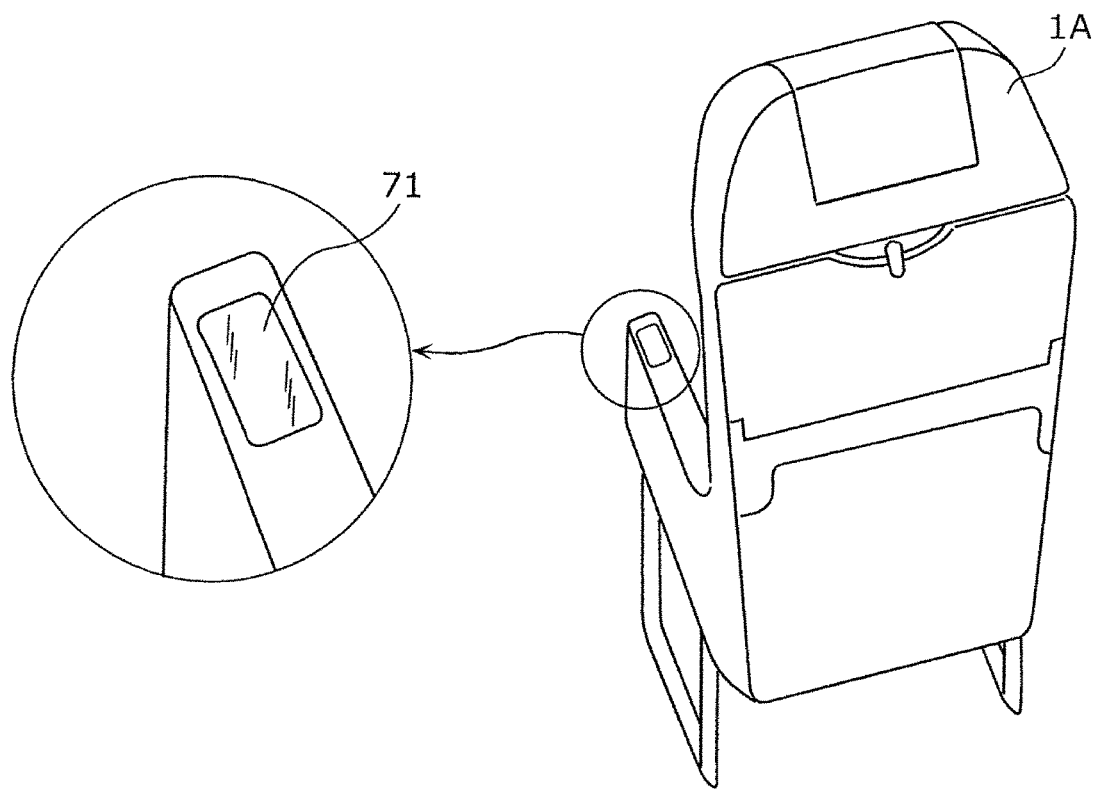
FIG. 16 is a diagram illustrating a configuration in which an obtainer which reads an e-ticket, such as an electronic boarding pass, is installed in a seat.

FIG. 16 is a diagram illustrating a configuration in which the obtainer which reads an e-ticket, such as an electronic boarding pass, is installed in the seat.

The electronic boarding pass may be used in the form of a two-dimensional bar code printed on a piece of paper, and what is shown on a displayed of a mobile terminal such as a cellular phone. Otherwise, the electronic boarding pass may be used in the form of boarding pass information recorded in a near field communication (NFC) chip installed in a mobile terminal such as a smartphone, an IC card, or the like In a case of, for example, a train other than the aircraft, the electronic passenger ticket may be used in the form of passenger ticket information recorded in an IC card such as an ICCOCA (registered trademark) card and a SUICA (registered trademark) card. Furthermore, in the case of a train, the electronic passenger ticket may be used in the form of passenger ticket information which the passenger 90 beforehand inputs into an express card when the passenger 90 purchases a passenger ticket with a seat reservation through the Shinkansen express reservation (registered trademark) system, and personal information registered in a mobile SUICA (registered trademark) card may be used as the passenger ticket information when the passenger 90 uses the mobile SUICA (registered trademark).

In a case where the passenger ticket information or the boarding pass information is obtained from the electronic passenger ticket or the electronic boarding pass in Embodiment 2, Embodiment 2 employs a system in which the passenger's own height value, or at least the passenger's own age and sex are registered into the electronic passenger ticket or the electronic boarding pass when the passenger purchases the electronic passenger ticket or the electronic boarding pass. Incidentally, the system for registering the passenger's own age and sex into an aircraft boarding pass when the passenger purchases the aircraft boarding pass has already been introduced.

Returning to FIG. 15, the control circuit 20A detects the height of the passenger 90 seated in the seat 80A from the passenger ticket information or the boarding pass information obtained by the obtainer 71, reads a control coefficient corresponding to the detected height of the passenger 90 from the memory 50, generates a control signal by use of the read control coefficient, and outputs the generated control signal to the control speakers 31, 32.

2-2. Operation of Noise Control Apparatus

Next, descriptions will be provided for how the noise control apparatus 1 works.

FIG. 17 is a flowchart illustrating an example of how the noise control apparatus according to Embodiment 2 works.

In the noise control apparatus 1A, from the noise detector 10, the control circuit 20A obtains a noise signal representing noise from a noise source (S21).

From passenger ticket information or boarding pass information about the passenger seated in the seat 80A obtained by the obtainer 71 which obtains the passenger ticket information or the boarding pass information, the control circuit 20A detects the height of the passenger seated in the seat 80A (S22).

From the memory 50, the control circuit 20A reads a control coefficient corresponding to the detected height of the passenger 90, which is one among multiple control coefficients respectively set at different values depending on heights, each control coefficient used to generate a control signal which reduces the noise near the head of a passenger 90 with a corresponding height when the passenger gets seated in the seat 80A (S23).

The control circuit 20A generates a control signal by use of the obtained noise signal and the read control coefficient (S24).

The control circuit 20A outputs the generated control signal to the control speakers 31, 32 which are installed at the first position in the seat 80A (S25).

2-3. Effects and the Like

The noise control apparatus 1A according to Embodiment 2 detects the height of the passenger 90 seated in the seat 80A from the passenger ticket information or the boarding pass information obtained by the obtainer 71, reads the control coefficient corresponding to the detected height from the memory 50, generates the control signal which reduces the noise near the head by use of the obtained noise signal and the read control coefficient, and outputs the generated control signal to the control speakers 31, 32.

Thereby, the control signal is generated by use of the control coefficient corresponding to the detected height which is detected from the passenger ticket information or the boarding pass information about the seated passenger. Thus, the noise can be effective reduced at the position of the head of the seated passenger. Like this, the height of the passenger can be obtained using the more direct method. Accordingly, a more appropriate noise reduction effect can be realized for passengers with different heights.

2-4. Modifications

2-4-1. Modification 1

In the noise control apparatus 1A according to Embodiment, in the height detection, the control circuit 20 may detect the height of the passenger 90 seated in the seat 80 by: detecting the age and sex of the passenger 90 from the passenger ticket information or the boarding pass information obtained by the obtainer 71; and estimating the height of the passenger 90 from the detected age and sex. To put it specifically, in the height estimation, the control circuit 20 may estimate the height of the passenger by: using a table of average heights of men and women at the each age; and identifying an average height associated in the average height table with the age and sex of the passenger detected in the height detection.

In this respect, the method of estimating the height from the age and sex may use, for example, information about the association of the age, sex and heights which is listed in a table as illustrated in FIG. 2 may be used. In short, the height may be estimated from the age and sex by use of this information. Incidentally, in a case where this method is intended to be used for an international flight aircraft, the method is applicable to passengers of nationalities other than Japanese nationality by, for each nationality, preparing a table which lists average heights of men and women at each age. Furthermore, appropriate height values can be used by using the latest tables publicized by each country, the WHO, or the like.

2-4-2. Modification 2

Moreover, in the noise control apparatus 1A according to Embodiment 2, the control circuit 20A may stop its operation in the seat 80A in which the obtainer 71 is installed, and shut down in a case where the seat 80A in which the obtainer 71 is installed is different from a seat associated in the passenger ticket information or the boarding pass information obtained by the obtainer 71.

Moreover, in the case where the seat 80A in which the obtainer 71 is installed is different from the seat associated in the passenger ticket information or the boarding pass information obtained by the obtainer 71, the control circuit 20A may cause the control speakers 31, 32 to output a warning sound, or a voice message which informs the passenger that the passenger is seated in a wrong seat. Meanwhile, in the case where the seat 80A in which the obtainer 71 is installed is the same as the seat associated in the passenger ticket information or boarding pass information obtained by the obtainer 71, the control circuit 20A may cause the control speaker 31, 32 to output a welcome sound, or a gratefulness or greeting voice message which informs the passenger that the passenger is seated in a right seat.

For example, FIG. 15, when getting seated in a purchased reserved seat, the passenger 90 causes the obtainer 71 in the seat 80A to read the passenger ticket information or the boarding pass information by touching an IC card or a mobile terminal to the obtainer 71. If the passenger is getting seated in a wrong seat, the control circuit 20A may reproduce a warning sound, or a voice message which tells that the passenger is getting seated in a wrong seat, from the control speakers 31, 32. If the passenger is getting seated in a right seat, the control circuit 20A may reproduce a voice message which tells "Thank you for flying with us" or similar words, and activate the noise control function. Incidentally, if the passenger is getting seated in a wrong seat, the control circuit 20A may deactivate the noise control function by shutting down main components in the control circuit 20A, for example, an amplifier which drives the control speakers 31, 32, a signal processor, and the like. Thereby, unnecessary power consumption can be inhibited.

It should be noted that although this embodiment has been discussed as being applied to an aircraft, the embodiment is not limited to this, and is applicable to public transportation such as a train for which passenger tickets are used.

It should be noted that components in each embodiment may be made from dedicated hardware, or implemented by executing software programs suitable for the components. The components may be implemented by causing a program executor, such as a CPU or a processor, to read and execute a software program stored on a recording medium such as a hard disk or a semiconductor memory. In this point, software which implements the noise control apparatus according to each embodiment is a program as follows.

This program causes a computer to execute a noise control method to be performed by the noise control apparatus which reduces the noise at the position away from a head of a passenger seated in the seat by the predetermined distance, the seat installed in the room under the noisy environment created by the predetermined noise source. The noise control method includes: from the noise detector, obtaining the noise signal representing the noise from the noise source; from the weight sensor installed in the seat, obtaining the weight of the passenger detected by the weight sensor; from the memory, reading the control coefficient corresponding to the obtained weight of the passenger or to the correlation value correlating with the weight, the control coefficient being one of the multiple control coefficients respectively set at different values depending on the weights or on the correlation values correlating with the weights, each control coefficient used to generate the control signal which reduces the noise at the position which becomes higher in the height direction from the seat surface of the seat as the corresponding weight becomes heavier; generating the control signal by use of the obtained noise signal and the read control coefficient; and outputting the generated control signal to the control speakers installed at the first position in the seat.

Furthermore, this program causes a computer to execute a noise control method to be performed by the noise control apparatus which reduces the noise at the position away from a head of a passenger seated in the seat by the predetermined distance, the seat installed in the room under the noisy environment created by the predetermined noise source. The noise control method includes: from the noise detector, obtaining the noise signal representing the noise from the noise source; detecting the height of the passenger seated in the seat from the passenger ticket information or the boarding pass information about the passenger obtained by the obtainer which obtains the passenger ticket information or the boarding pass information about the passenger seated in the seat; from the memory, reading the control coefficient corresponding to the detected height of the passenger, the control coefficient being one of the multiple control coefficients respectively set at different values depending on the heights, each control coefficient used to generate the control signal which reduces the noise at the position away from the head of the passenger with the corresponding height by the predetermined distance when the passenger gets seated in the seat; generating the control signal by use of the obtained noise signal and the read control coefficient; and outputting the generated control signal to the control speakers installed at the first position in the seat.

The noise control apparatuses and the noise control methods according to one or more aspects of the present disclosure have been discussed based on the embodiments, but the present disclosure is not limited to these embodiments. Modes obtained by applying various modifications at which those skilled in the art may arrive to the embodiments, and modes created by combining components in different embodiments may be included in the scope of the one or more aspects of the present disclosure, as long as they do not depart from the spirit or gist of the present disclosure.

The present disclosure is effective as the noise control apparatus and the noise control method which are capable of effectively reducing noise.

What is claimed is:

1. A noise control apparatus which reduces noise at a position away from a head of a passenger seated in a seat by a predetermined distance, the seat installed in a room under a noisy environment created by a predetermined noise source, comprising:
   a weight sensor installed in the seat;
   a control speaker installed at a first position in the seat;
   a noise detector which detects the noise from the noise source, and outputs a noise signal representing the detected noise;
   a control circuit which obtains the noise signal outputted from the noise detector, and outputs a control signal to the control speaker, the control signal being that which reduces the noise at the position away from the head of the passenger by the predetermined distance; and
   a memory which stores a plurality of control coefficients respectively set at different values depending on weights or on correlation values correlating with the weights, each control coefficient used to generate the control signal which reduces the noise at a position which becomes higher in a height direction from a seat surface of the seat as the corresponding weight becomes heavier, wherein
   the control circuit
      reads the control coefficient corresponding to the weight of the passenger detected by the weight sensor or to a correlation value correlating with the weight from the memory, the control coefficient being one among the plurality of control coefficients,
      generates the control signal by use of the noise signal and the read control coefficient, and
      outputs the generated control signal to the control speaker.

2. The noise control apparatus according to claim 1, further comprising:
   a height estimator which estimates a height of the passenger depending on the weight of the passenger detected by the weight sensor, wherein
   the memory stores the plurality of control coefficients beforehand set depending on heights as the correlation values, and
   in the control coefficient reading, the control circuit reads the control coefficient corresponding to the height of the passenger estimated by the estimator, from the plurality of control coefficients.

3. The noise control apparatus according to claim 2, wherein
the height estimator estimates the height of the passenger by use of the weight of the passenger detected by the weight sensor and a body mass index (BMI).

4. The noise control apparatus according to claim 3, wherein
the height estimator estimates the height of the passenger by identifying a height associated with the weight of the passenger detected by the weight sensor, where a height-weight relationship is expressed with BMI=23 in the body mass index.

5. The noise control apparatus according to claim 3, wherein
the height estimator
given that the height of the passenger to be used to control the output of the control signal to the control speaker is a height within a height range having a length of a first height to a second height inclusive and the height range is divided into N division ranges,
identifies N which satisfies a condition that a length of each of the N division ranges is equal to ¼ of a wavelength of an upper limit frequency among frequencies to be used for the control, and
identifies a center value in a height division range as the height, the height division range corresponding to a weight range including the obtained weight of the passenger, the weight range being one among N weight ranges which are separated by a plurality of weights respectively associated with a plurality of boundary values between the N division ranges, where a height-weight relationship is expressed with BMI=23 in the body mass index.

6. The noise control apparatus according to claim 3, wherein
the height estimator uses a first corresponding relationship between a height of 155 cm and a weight of 55 kg of a passenger, a second corresponding relationship between a height of 165 cm and a weight of 62.5 kg thereof, a third corresponding relationship between a height of 175 cm and a weight of 70.5 kg thereof, and a fourth corresponding relationship between a height of 185 cm and a weight of 78.5 kg thereof, where a height-weight relationship is BMI=23 in the body mass index, and
the height estimator
identifies a center value of 160 cm between the height in the first corresponding relationship and the height in the second corresponding relationship as the height if the weight obtained from the weight sensor is 55 kg or greater but less than 62.5 kg,
identifies a center value of 170 cm between the height in the second corresponding relationship and the height in the third corresponding relationship as the height if the weight obtained from the weight sensor is 62.5 kg or greater but less than 70.5 kg, and
identifies a center value of 180 cm between the height in the third corresponding relationship and the height in the fourth corresponding relationship as the height if the weight obtained from the weight sensor is 70.5 kg or greater but less than 78.5 kg.

7. The noise control apparatus according to claim 3, wherein the height estimator uses
a first corresponding relationship between a height of 155 cm and a weight 44 kg of a passenger, where a height-weight relationship is BMI=18.5 in the body mass index,
a second corresponding relationship between a height of 160 cm and a weight of 59 kg thereof, where the height-weight relationship is BMI=23 in the body mass index, and
a third corresponding relationship between a height of 170 cm and a weight of 72 kg thereof, and a fourth corresponding relationship between a height of 180 cm and a weight of 81 kg thereof, where the height-weight relationship is BMI=25 in the body mass index, and the height estimator
identifies the height of 160 cm in the second corresponding relationship as the height if the weight obtained from the weight sensor is 44 kg or greater but less than 59 kg,
identifies the height of 170 cm in the third corresponding relationship as the height if the weight obtained from the weight sensor is 59 kg or greater but less than 72 kg, and
identifies the height of 180 cm in the fourth corresponding relationship as the height if the weight obtained from the weight sensor is 72 kg or greater but less than 81 kg.

8. The noise control apparatus according to claim 1, wherein
the control circuit does not output the control signal to the control speaker if the weight obtained from the weight sensor is less than a predetermined threshold.

9. The noise control apparatus according to claim 8, wherein
the threshold is 40 kg.

10. The noise control apparatus according to claim 1, wherein
the control circuit stops its operation or shuts down if the weight obtained from the weight sensor is less than a predetermined threshold.

11. The noise control apparatus according to claim 1, further comprising a sound collector which is installed at a second position in the seat, and which collects the noise at the second position, the second position being different from the first position, wherein
the control circuit
repeatedly obtains an output signal from the sound collector,
in the control signal generation, adjusts the control coefficient so as to minimize the obtained output signal, and repeatedly generates the control signal by use of the adjusted control coefficient, the control signal being that which reduces the noise at the position away from the head by the predetermined distance.

12. A noise control apparatus which reduces noise at a position away from a head of a passenger seated in a seat by a predetermined distance, the seat installed in a room under a noisy environment created by a predetermined noise source, comprising:
an obtainer which obtains passenger ticket information or boarding pass information about the passenger seated in the seat;
a control speaker installed at a first position in the seat;
a noise detector which detects the noise from the noise source, and outputs a noise signal representing the detected noise;
a control circuit which obtains the noise signal outputted from the noise detector, and outputs a control signal to the control speaker, the control signal being that which reduces the noise at the position away from the head of the passenger by the predetermined distance; and a memory which stores a plurality of control coefficients respectively set at different values depending on heights, each control coefficient used to generate the control signal which reduces the noise at a position away from the head of a passenger with a corresponding height by a predetermined distance when the passenger gets seated in the seat, wherein the control circuit detects a height of the passenger seated in the seat from the passenger ticket information or the boarding pass information obtained by the obtainer, reads the control coefficient corresponding to the detected height of the passenger from the memory, generates the control signal by use of the noise signal and the read control coefficient, and outputs the generated control signal to the control speaker.

13. The noise control apparatus according to claim 12, wherein in the height detection, the control circuit detects the height of the passenger seated in the seat by detecting an age and a sex of the passenger from the passenger ticket information or the boarding pass information obtained by the obtainer, and estimating the height from the detected age and sex.

14. The noise control apparatus according to claim 13, wherein in the height estimation, the control circuit estimates the height of the passenger by using a table of average heights of men and women by age, and identifying an average height which is associated in the table of average heights with the age and sex of the passenger detected in the height detection.

15. The noise control apparatus according to claim 12, wherein if a seat in which the obtainer is installed is different from the seat associated in the passenger ticket information or the boarding pass information obtained by the obtainer, the control circuit stops its operation or shut down in the seat in which the obtainer is installed.

16. The noise control apparatus according to claim 12, wherein if a seat in which the obtainer is installed is different from the seat associated in the passenger ticket information or the boarding pass information obtained by the obtainer, the control circuit causes the control speaker to output a warning sound or a voice message which informs the passenger that the passenger is seated in a wrong seat, and if the seat in which the obtainer is installed is the same as the seat associated in the passenger ticket information or the boarding pass information obtained by the obtainer, the control circuit causes the control speaker to output a welcome sound, or a gratefulness or greeting voice message which informs the passenger that the passenger is seated in a right seat.

17. A noise control method to be performed by a noise control apparatus which reduces noise at a position away from a head of a passenger seated in a seat by a predetermined distance, the seat installed in a room under a noisy environment created by a predetermined noise source, comprising:

from a noise detector, obtaining a noise signal representing the noise from the noise source;

from a weight sensor installed in the seat, obtaining a weight of the passenger detected by the weight sensor;

from a memory, reading a control coefficient corresponding to the obtained weight of the passenger or to a correlation value correlating with the weight, among a plurality of control coefficients respectively set at different values depending on weights or on correlation values correlating with the weights, each control coefficient used to generate the control signal which reduces the noise at a position which becomes higher in a height direction from a seat surface of the seat as the corresponding weight becomes heavier;

generating the control signal by use of the obtained noise signal and the read control coefficient; and outputting the generated control signal to a control speaker installed at a first position in the seat.

18. A noise control method to be performed by a noise control apparatus which reduces noise at a position away from a head of a passenger seated in a seat by a predetermined distance, the seat installed in a room under a noisy environment created by a predetermined noise source, comprising:

from a noise detector, obtaining a noise signal representing the noise from the noise source;

detecting a height of the passenger seated in the seat from passenger ticket information or boarding pass information about the passenger obtained by a obtainer which obtains the passenger ticket information or the boarding pass information about the passenger seated in the seat;

from a memory, reading a control coefficient corresponding to the detected height of the passenger among a plurality of control coefficients respectively set at different values depending on heights, each control coefficient used to generate the control signal which reduces the noise at a position away from the head of a passenger with a corresponding height by the predetermined distance when the passenger gets seated in the seat;

generating the control signal by use of the obtained noise signal and the read control coefficient; and outputting the generated control signal to a control speaker installed at a first position in the seat.

* * * * *